(12) United States Patent
Issa et al.

(10) Patent No.: US 8,826,337 B2
(45) Date of Patent: *Sep. 2, 2014

(54) PUBLISHING KEY FRAMES OF A VIDEO CONTENT ITEM BEING VIEWED BY A FIRST USER TO ONE OR MORE SECOND USERS

(71) Applicant: Porto Technology, LLC, Wilmington, DE (US)

(72) Inventors: Alfredo C. Issa, Apex, NC (US);
Richard J. Walsh, Raleigh, NC (US);
Kunal Kandekar, Raleigh, NC (US);
Gregory M. Evans, Raleigh, NC (US);
Scott Curtis, Durham, NC (US)

(73) Assignee: Porto Technology, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,871

(22) Filed: Nov. 5, 2012

(65) Prior Publication Data
US 2013/0061263 A1 Mar. 7, 2013

Related U.S. Application Data

(63) Continuation of application No. 12/107,203, filed on Apr. 22, 2008, now Pat. No. 8,307,395.

(51) Int. Cl.
*H04N 5/445* (2011.01)
(52) U.S. Cl.
USPC .............................. 725/46; 725/54; 709/219
(58) Field of Classification Search
USPC ................. 725/39–61, 87–120; 709/217–232
See application file for complete search history.

(56) References Cited

U.S. PATENT DOCUMENTS

| | | | | |
|---|---|---|---|---|
| 5,333,091 A | * | 7/1994 | Iggulden et al. | 386/281 |
| 5,864,366 A | | 1/1999 | Yeo | |
| 5,884,031 A | * | 3/1999 | Ice | 709/203 |
| 6,145,084 A | * | 11/2000 | Zuili et al. | 726/3 |
| 6,340,971 B1 | | 1/2002 | Janse et al. | |
| 6,646,655 B1 | | 11/2003 | Brandt et al. | |

(Continued)

FOREIGN PATENT DOCUMENTS

| | | |
|---|---|---|
| CN | 1324185 | 11/2001 |
| WO | WO 2007/078338 | 7/2007 |
| WO | WO 2007/111790 | 10/2007 |

OTHER PUBLICATIONS

M. Milanesio et al., "Accessing and Distributing Streaming Events on DHT-based Systems," Proceedings of the Second International Conference on Automated Production of Cross Media Content for Multi-Channel Distribution, 2006, 7 pages.

*Primary Examiner* — Annan Shang

(57) ABSTRACT

Systems and methods for obtaining key frames of video content items being viewed by first users and publishing the key frames of the video content items to second users are provided. In general, either prior to playback of a video content item by a first user or during playback of the video content item by the first user, key frame information providing, referencing, or identifying key frames of the video content item is obtained. Each key frame is representative of a segment of the video content item. The key frame information for the video content item is then published such that each key frame is presented to one or more second users while the first user views the corresponding segment of the video content item.

44 Claims, 20 Drawing Sheets

(56) References Cited

U.S. PATENT DOCUMENTS

| | | |
|---|---|---|
| 6,699,127 B1 | 3/2004 | Lobb et al. |
| 6,711,741 B2 | 3/2004 | Yeo |
| 6,731,314 B1 | 5/2004 | Cheng et al. |
| 6,732,183 B1 | 5/2004 | Graham |
| 6,819,752 B2 | 11/2004 | Raniere et al. |
| 6,882,793 B1 | 4/2005 | Fu et al. |
| 6,918,084 B1 * | 7/2005 | Slaughter et al. ............. 715/205 |
| 7,080,394 B2 | 7/2006 | Istvan et al. |
| 7,159,186 B2 | 1/2007 | Mattila et al. |
| 7,227,529 B2 | 6/2007 | Suomela |
| 7,289,813 B2 | 10/2007 | Karaoguz |
| 7,330,966 B2 * | 2/2008 | Ice et al. ........................... 713/2 |
| 7,334,249 B1 | 2/2008 | Byers |
| 7,574,523 B2 * | 8/2009 | Traversat et al. ............. 709/238 |
| 7,774,495 B2 | 8/2010 | Pabla et al. |
| 8,028,314 B1 | 9/2011 | Sezan et al. |
| 8,037,202 B2 * | 10/2011 | Yeager et al. ................. 709/238 |
| 8,346,818 B2 * | 1/2013 | DeAnna et al. ............... 707/804 |
| 8,682,362 B2 * | 3/2014 | Knotts ........................... 455/466 |
| 2001/0047294 A1 | 11/2001 | Rothschild |
| 2005/0188399 A1 | 8/2005 | Tischer |
| 2005/0229118 A1 | 10/2005 | Chiu et al. |
| 2006/0161950 A1 | 7/2006 | Imai et al. |
| 2006/0271997 A1 | 11/2006 | Jacoby et al. |
| 2007/0087682 A1 | 4/2007 | DaCosta |
| 2007/0155307 A1 | 7/2007 | Ng et al. |
| 2007/0161382 A1 | 7/2007 | Melinger et al. |
| 2007/0168413 A1 | 7/2007 | Barletta et al. |
| 2008/0140502 A1 | 6/2008 | Birnholz et al. |
| 2009/0030774 A1 | 1/2009 | Rothschild et al. |
| 2009/0254931 A1 | 10/2009 | Pizzurro et al. |

* cited by examiner

| Key Frame 1 time: 0-1.21 | Key Frame 2 time: 1.21-4:35 | Key Frame 3 time: 4:35-6.34 | Key Frame 4 time: 6.34-7.45 | Key Frame 5 time: 7.45-9.01 | ... | Key Frame n time: nn-nn |
|---|---|---|---|---|---|---|
| Richard's Cool Commentary ☆☆☆☆ | What the Heck? ☆☆☆☆ | Steve looks Weird here ☆☆☆☆ | This really happened. check out: http://.... ☆☆☆☆ | I love Pam | ... | ... |

PUBLISHING KEY FRAMES OF A VIDEO CONTENT ITEM BEING VIEWED BY A FIRST USER TO ONE OR MORE SECOND USERS

RELATED APPLICATIONS

This application is a Continuation of U.S. patent application Ser. No. 12/107,203, entitled Publishing Key Frames Of A Video Content Item Being Viewed By A First User To One Or More Second Users, filed on Apr. 22, 2008, which is commonly owned with this application and the disclosure of which is herein incorporated by reference in its entirety.

FIELD OF THE INVENTION

The present invention relates to publishing key frames of a video content item being viewed by a first user to one or more second users.

BACKGROUND OF THE INVENTION

Social networking websites and applications are becoming increasingly popular. For example, social networking websites such as MySpace, Facebook, and LinkedIn have emerged and enable users to create social networks. Such social networks provide a substantial opportunity for sharing user contexts.

SUMMARY OF THE INVENTION

The present invention relates to obtaining key frames of video content items being viewed by first users and publishing the key frames of the video content items to second users. In general, either prior to playback of a video content item by a first user or during playback of the video content item by the first user, key frame information for the video content item is obtained. The key frame information may include key frames of the video content item, references to the key frames of the video content item stored by one or more remote sources, or information identifying the key frames of the video content item to enable extraction of the key frames by a recipient device or service. Each key frame is representative of a segment of the video content item. The key frame information for the video content item is then published such that the each key frame is presented to one or more second users while the first user views the corresponding segment of the video content item.

In one embodiment, the key frames of the video content item being viewed by the first user are published to the one or more second users as part of a profile of the first user. The profile may be presented to the one or more second users via a social networking service, such as a social networking website, peer devices of the second users, or the like. In another embodiment, the key frames of the video content item being viewed by the first user are published to the one or more second users as part of buddy lists of the one or more second users. In yet another embodiment, the key frames of the video content item being viewed by the first user are published such that the key frames are presented to the one or more second users in a key frame presentation billboard. The key frame presentation billboard may be provided by a social networking service or peer devices of the one or more second users.

In one embodiment, the published key frame information for the video content item being played by the first user may be modified to insert advertisements into the key frame sequence for the video content item. The advertisements may replace select key frames of the video content item, be inserted before or after select key frames of the video content item, be inserted between two select key frames of the video content item, be inserted into select key frames of the video content item, or the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a flow chart illustrating a process for publishing key frames of a video content item being viewed by a first user to one or more second users according to one embodiment of the present invention;

FIG. 2 graphically illustrates key frames and annotations for an exemplary video content item according to one embodiment of the present invention;

Figure 18:
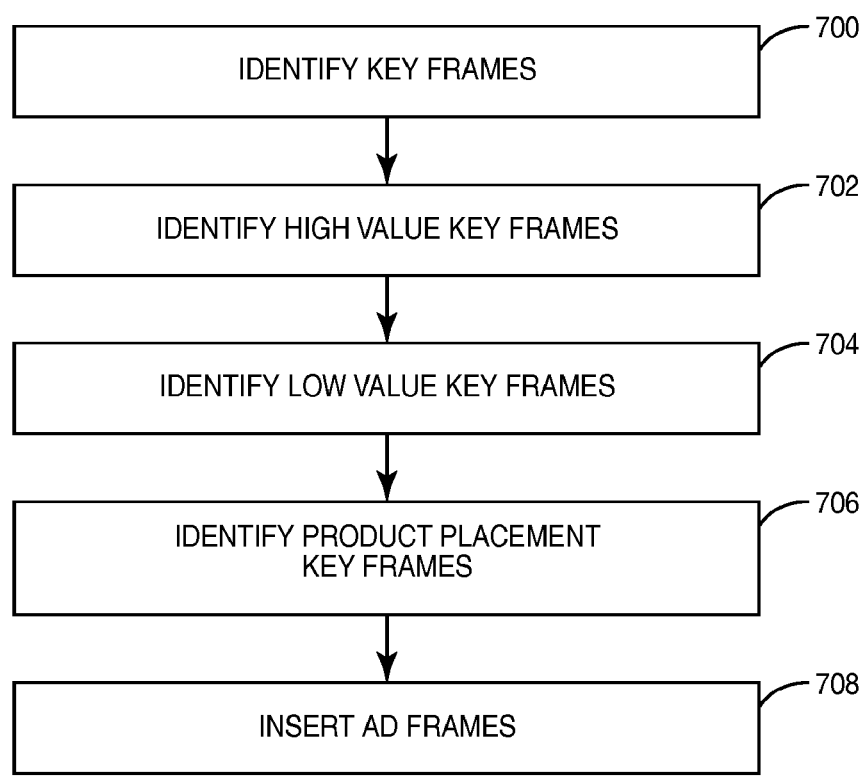
FIG. 18 is a flow chart illustrating the operation of the system of FIG. 17 according to one embodiment of the present invention.
Figure 19:
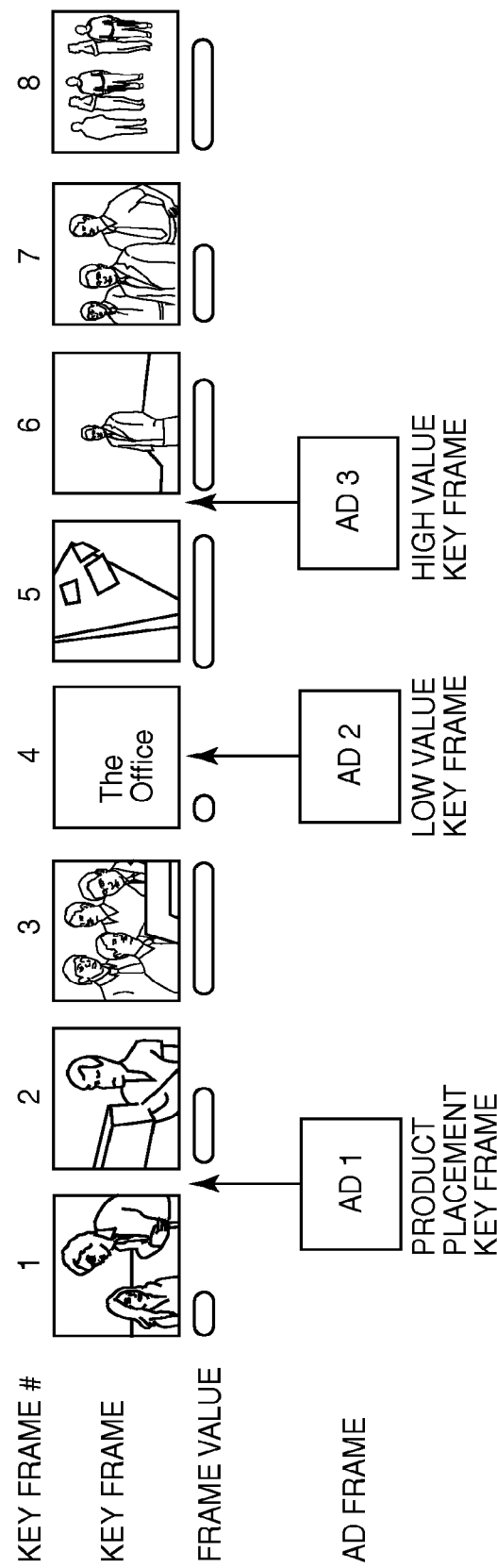
Figure 20:
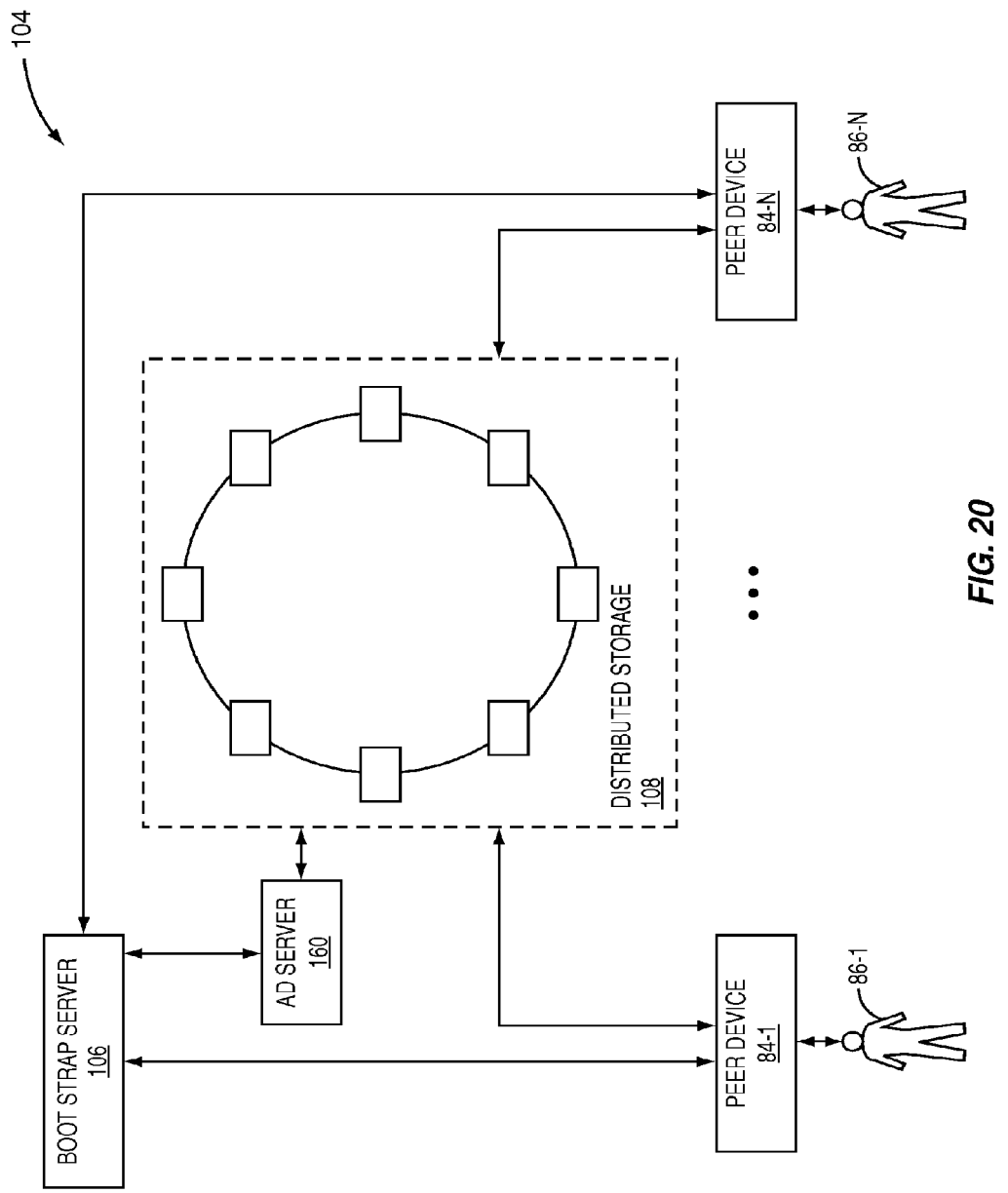
Figure 21:
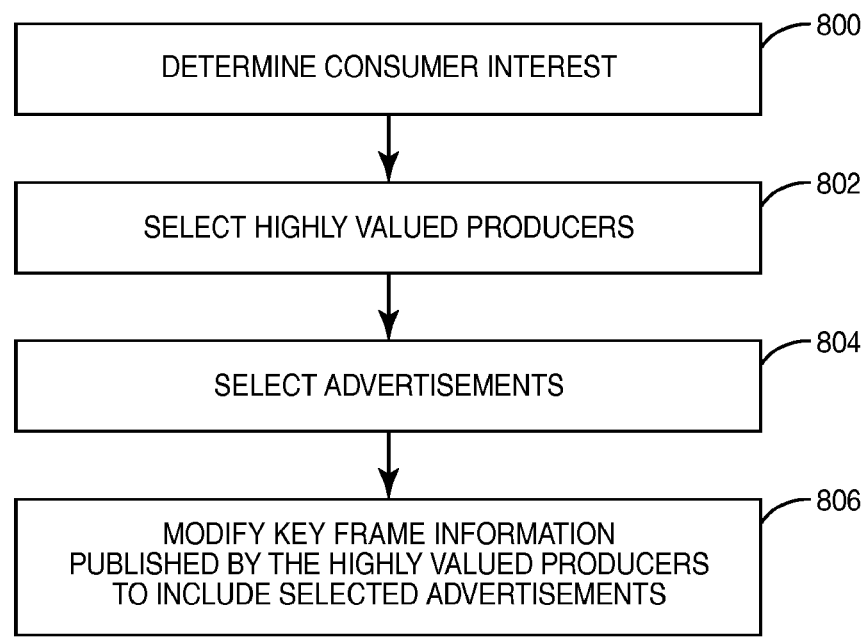

FIG. 19 graphically illustrates inserting advertisements into a key frame sequence utilizing the process of FIG. 18 according to one embodiment of the present invention;

FIG. 20 illustrates a system for publishing key frames of video content items viewed by one or more first users to one or more second users including an ad server for inserting advertisements into key frame sequences according to another embodiment of the present invention; and FIG. 21 is a flow chart illustrating the operation of the system of FIG. 20 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
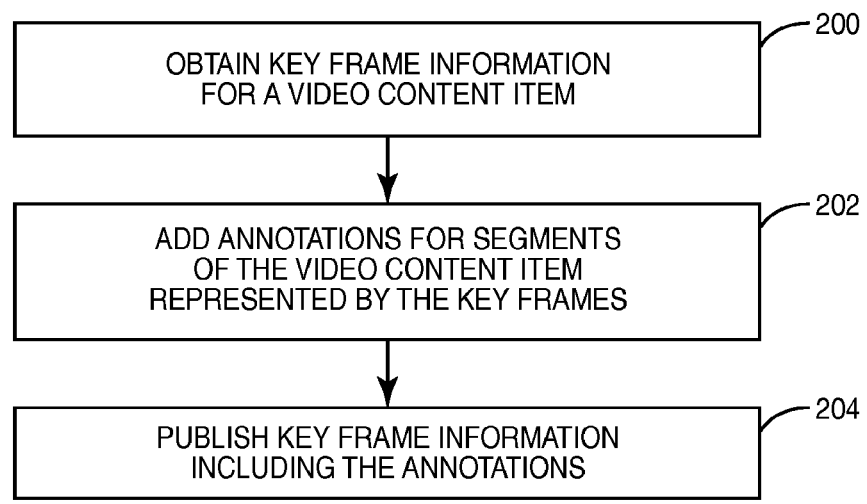

FIG. 1 is a flow chart illustrating a process for publishing key frames of a video content item being viewed by a first user to one or more second users according to one embodiment of the present invention. First, key frame information for a video content item is obtained (step 200). The key frames may be, for example, I-Frames, or select I-Frames, of the video content item. However, the present invention is not limited thereto. The key frame information may be key frames of the video content item, references to key frames of the video content item hosted by one or more remote sources such as a media distribution service like the Apple® iTunes® store or RealNetworks® Rhapsody Unlimited, information identifying the key frames of the video content item which may be used to extract the key frames from the video content item or a stream of the video content item, or the like.

The key frames are frames of the video content item selected using any desired technique, where each key frame corresponds to or is representative of a segment of the video content item. In one embodiment, the key frames may be manually selected. For example, the key frames may be manually selected by a producer or creator of the video content item, by a viewer or group of viewers of the video content item, by the first user in preparation for publishing the key frames to the one or more second users, or the like.

The key frames may additionally or alternatively be automatically, or programmatically, selected based on one or more criteria. As a first example, the criteria may include user ratings applied to segments of the video content item or frames of the video content item. The user ratings may be user ratings provided by the first user for which the key frames are to be published or user ratings provided by other users.

As a second example, the criteria may include metadata associated with the video content item describing segments of the video content item. Key frames may then be selected and obtained based on one or more user-defined rules and the metadata. In one embodiment, user preferences of the first user for which the key frames are to be published and/or user preferences of the one or more second users to which the key frames are to be published may be used as rules for selecting key frames of the video content item based on the metadata. For example, the first user may choose to publish one or more frames of any car-chase scene as key frames. As another example, one of the second users to which the key frames are to be published may indicate that he or she does not desire key frames including content that is inappropriate for children, such as violence or nudity. As such, frames of the video content item including such content, as indicated by the associated metadata, will not be selected as key frames for that second user or for any of the second users to which the key frames of the video content item are to be published. Note that the second users to which the key frames are to be published may be categorized into one or more social network groups such as, for example, "friends," "family," "co-workers," and the like. Rules for selecting key frames may be defined independently for each of the social network groups such that relationship characteristics may determine key frame selection. Note that while in one embodiment the second users to which the key frames are to be published are related to the first user via a social network, buddy list, or the like, the present invention is not limited thereto. As discussed below, in one or more embodiments of the present invention, the first and second users may be complete strangers.

As a third example, key frame analysis may be used to select the key frames for the video content item. More specifically, the frames of the video content item may be programmatically analyzed to identify frames that are well suited to being used as key frames. For example, the frames of the video content item may be analyzed to identify a key frame approximately every minute, where frames occurring in the range of 15 seconds before the 1-minute mark and 15 seconds after the 1-minute mark may be analyzed to select the best frame for use as a key frame. For example, the analysis may consider criteria such as the clarity of the frames, the lightness/darkness of the frames, whether people are within the frames, or the like.

The key frame information may be obtained prior to playback of the video content item by the first user for which the key frames are to be published, during playback by the first user, or a combination thereof. In one embodiment, the key frame information is or includes the key frames of the video content item. The key frames may be extracted from the video content item in real-time during playback of the video content item. Alternatively, the key frames may be obtained either before or after playback is initiated from one or more remote sources. For example, if the video content item is purchased or rented from a media distribution service, the key frames may be packaged or otherwise downloaded in association with the video content item. In another embodiment, the key frame information includes a reference to a set of key frames for the video content item or references to the individual key frames for the video content item at one or more remote sources, such as a media distribution service. The reference to the set of key frames or references to the individual key frames may be downloaded or otherwise obtained from the one or more remote sources either before or during playback of the video content item.

In yet another embodiment, the key frame information may include information identifying the key frames of the video content item obtained prior to or during playback via local analysis of the video content item or from a remote source, such as, for example, a media distribution service. This information may be, for example, a time offset from a start of playback of the video content item. For example, if a video content item is a movie having a play length of 120 minutes, the information identifying the key frames may include time offsets, such as XX minutes, YY seconds, and ZZ milliseconds, defining playback points during the 120 minute movie that have been selected as key frames. Thus, when the key frame information is published to peer devices of the one or more second users, the key frames may be extracted from local copies of the video content item or a stream of the video content item received by the peer devices as needed. As another example, the key frame information may include a key frame number identifying a key frame from a set of key frames available from a remote source such as a media distribution service.

In addition, annotations may optionally be created for the segments of the video content item represented by the key frames (step 202). The annotations are preferably comments, user ratings, or the like provided by the first user. The key frame information and, optionally, the annotations are then published to the one or more second users such that the key frames of the video content item and, optionally, the annotations are presented to the one or more second users as the corresponding segments of the video content item are viewed by the first user (step 204).

As discussed below, the manner in which the key frames and annotations are published to the one or more second users may vary depending on the particular implementation. In one embodiment, the key frames and annotations are published via a social networking service such as a social networking website like Facebook or MySpace. When published via a social networking service, the key frames and annotations may be provided as part of a user profile of the first user, in contact lists or buddy lists maintained by the social networking service for the one or more second users, a key frame presentation billboard, or the like. Note that the key frames may be published to the second users via any type of user device associated with the second users such as, for example, a personal computer, a mobile telephone such as a mobile smart phone, a set-top box, or the like.

In another embodiment, the key frames and annotations may be published and presented to the one or more second users via associated peer devices. For example, the key frames and annotations may be published to personal computers of the one or more second users where the key frames and annotations are presented in a user profile of the first user, buddy lists of the one or more second users, as part of a key frame presentation billboard for presenting key frames from a number of users including the first user, or the like. As another example, the key frames and annotations may be published to key frame production and consumption devices, as discussed below.

FIG. 2 illustrates exemplary key frames and annotations for a video content item provided according to one embodiment of the present invention. As illustrated, each key frame represents or corresponds to a segment of the video content item. In this example, the first key frame (Key Frame 1) corresponds to the first minute and twenty-one seconds of the video content item, the second key frame (Key Frame 2) corresponds to the segment of the video content item from the one-minute and twenty-one second mark to the four-minute and thirty-five second mark, etc. Annotations have been added for the segments of the video content item. The annotations may be, for example, comments added by a producer of the video content item, comments added by the user, user ratings, or the like. Note that the annotations are optional. In addition, annotations may be created for any number of the segments of the video content item. Annotations do not have to be created for all of the segments of the video content item.

Thus, in operation, while the first user is viewing the first segment of the video content item from the start of video content item to the one-minute and twenty-one second mark, the first key frame (Key Frame 1), and optionally any associated annotations, are presented to the one or more second users. Thereafter, while the first user is viewing the second segment of the video content item from the one-minute and twenty-one second mark to the four-minute and thirty-five second mark, the second key frame (Key Frame 2), and optionally any associated annotations, are presented to the one or more second users. In a similar manner, the remaining key frames are presented to the one or more second users while the first user is viewing the corresponding segments of the video content item.

Figure 3:
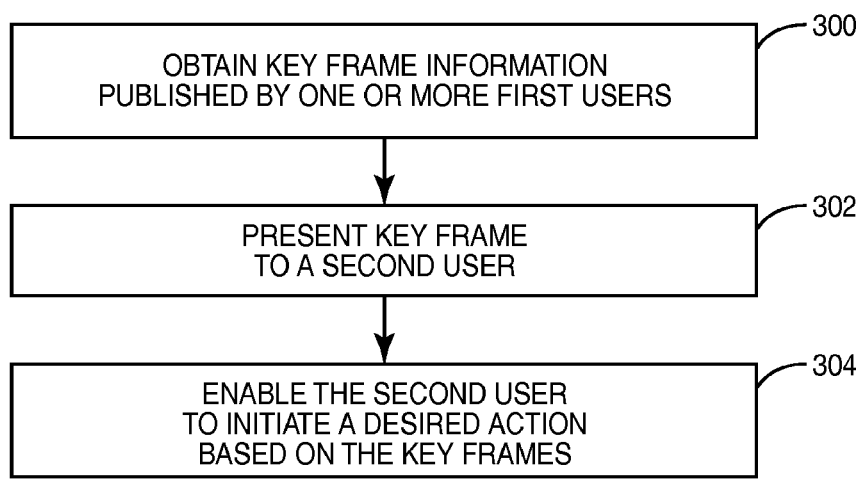
FIG. 3 is a flow chart illustrating a process for consuming key frames published by another user according to one embodiment of the present invention.

FIG. 3 is a flow chart illustrating a process for presenting key frames to a user to which the key frames have been published according to one embodiment of the present invention. First, key frame information published for one or more first users is obtained (step 300). As discussed below, the manner in which the published key frame information is obtained may vary depending on the particular embodiment. Next, the key frames, and optionally any associated annotations, are presented to a second user (step 302). Note that if the key frame information includes references to the key frames, the key frames are obtained from one or more remote sources hosting the key frames utilizing the references from the key frame information. Similarly, if the key frame information includes information identifying the key frames, the key frames are extracted from a local copy of the video content item, a stream of the video content item, or the like based on the information identifying the key frames. If the key frame information includes the key frames, then the key frames are obtained from the key frame information. Once the key frames are obtained, the manner in which the key frames and annotations are presented to the second user may vary depending on the particular embodiment.

The second user may then be enabled to initiate a desired action based on the key frames (step 304). For example, the second user may select a key frame published for a video content item being viewed by one of the one or more first users and choose to begin playback of a local or streamed copy of that video content item at the segment corresponding to the selected key frame. As another example, the second user may be enabled to purchase and download the video content item corresponding to a selected key frame from a media distribution service. As a third example, the second user may be enabled to search for more video content items that are like or similar to the video content item corresponding to a selected key frame. Like or similar video content items may be located by, for example, searching a collection of video content items made available by a media distribution service using any suitable search or query technique, searching the Internet using an Internet search engine, or the like. As a final example, the second user may be enabled to find other users that are also viewing a video content item corresponding to a selected key frame, other users currently viewing a video segment of the video content item corresponding to a selected key frame, or other users that are viewing media items that are similar to or related to the video content time corresponding to the selected key frame. The second user may additionally or alternatively be enabled to take or initiate other types of actions such as, for example, initiating a chat session with one or more users, schedule events such as watching a particular video content item simultaneously with one or more other users at a defined date and time, or the like, as will be apparent to one of ordinary skill in the art upon reading this disclosure.

Figure 4:
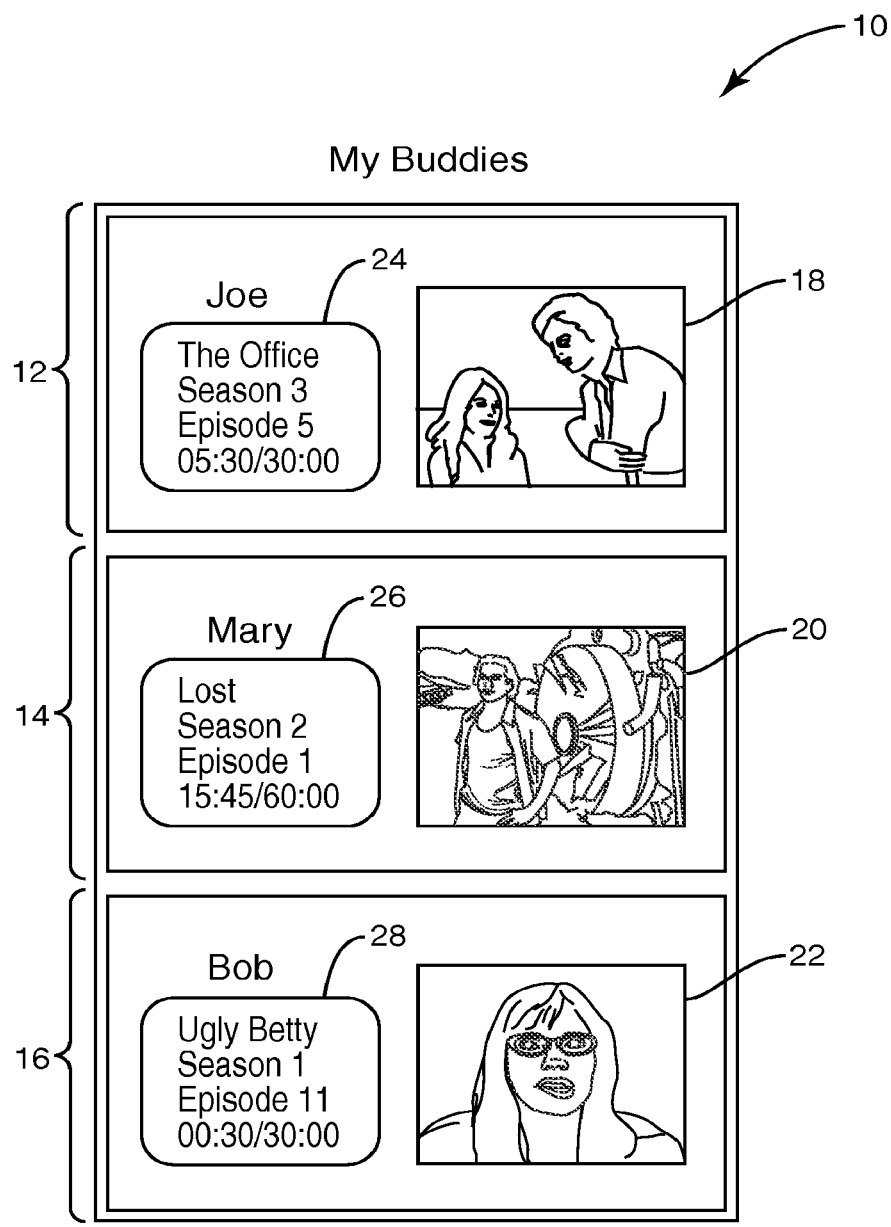
FIG. 4 illustrates an exemplary buddy list in which key frames are presented to a user according to one embodiment of the present invention.

FIG. 4 illustrates an exemplary buddy list 10 including key frames of video content items being viewed by users included in the buddy list 10 according to one embodiment of the present invention. The buddy list 10 includes entries 12 through 16 for a number of users that have been identified as friends or buddies of a user, or owner, of the buddy list 10. In this example, each of the entries 12 through 16 provides a username of the associated user. In addition, key frames 18 through 22 are presented for each of the users in the buddy list 10. Thus, for example, the key frame 18 is a key frame corresponding to a segment of a video content item currently being viewed by the user "Joe." As the user "Joe" continues to view that video content item, the key frame 18 is updated with new key frames corresponding to the segment of the video content item currently being viewed by the user "Joe." The key frame 20 is a key frame corresponding to a segment of a video content item currently being viewed by the user "Mary." As the user "Mary" continues to view that video content item, the key frame 20 is updated with new key frames corresponding to the segment of the video content item currently being viewed by the user "Mary." Likewise, the key frame 22 is a key frame corresponding to a segment of a video content item currently being viewed by the user "Bob." As the user "Bob" continues to view that video content item, the key frame 22 is updated with new key frames corresponding to the segment of the video content item currently being viewed by the user "Bob." Lastly, as illustrated, the entries 12 through 16 may include metadata and annotations 24 through 28. The metadata and annotations 24 through 28 may include metadata such as the title of the video content item being viewed by the corresponding user, a position in playback of the video content item by the corresponding user, and the like. The annotations are updated such that the annotations are annotations for the segments of the video content items being viewed by the users "Joe," "Mary," and "Bob" represented by the key frames 18 through 22.

Figure 5:
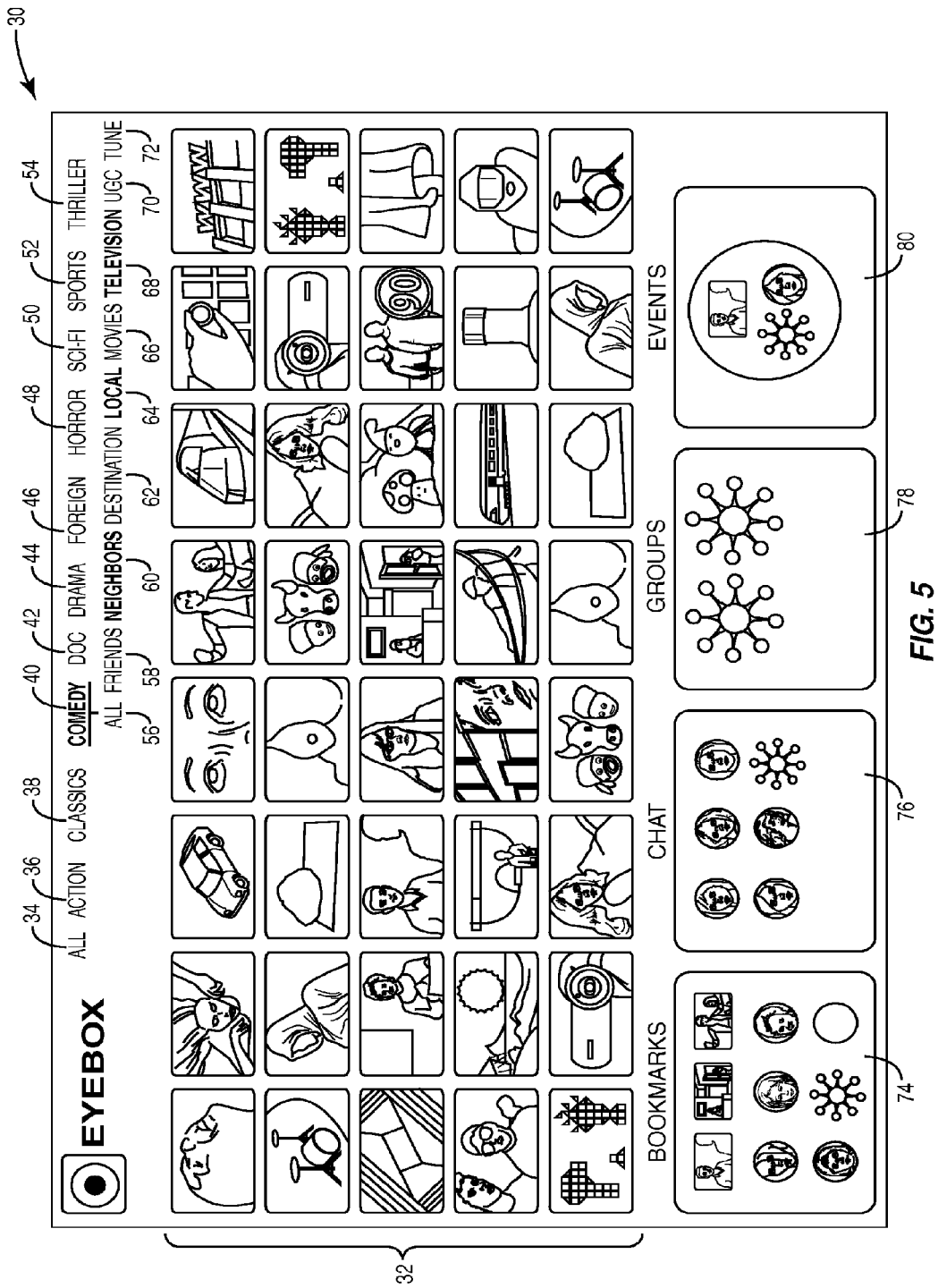
FIG. 5 illustrates an exemplary key frame presentation billboard for presenting key frames published by numerous users as those users view corresponding video content items according to one embodiment of the present invention.

FIG. 5 illustrates a key frame presentation billboard 30 according to one embodiment of the present invention. The key frame presentation billboard 30 operates to present key frames of video content items currently being viewed by a number of users. The key frame presentation billboard 30 may be presented via a centralized social networking service such as a social networking website. Alternatively, the key frame presentation billboard 30 may be a Graphical User Interface (GUI) presented by software, hardware, or a combined software and hardware application of a peer device of a user. In one embodiment, the GUI may be an overlay presented on top of video content presented to a user via, for example, a set-top box or DVD player and a television display.

In this example, the key frame presentation billboard 30 includes a key frame area 32 in which, for each of a number of users, a key frame of a video content item currently being viewed by the users is presented. As the users continue to view the video content items, the key frames for the users are updated such that, for each of the users, the presented key frame is the key frame for a segment of the video content item currently being viewed.

In addition, the key frame presentation billboard 30 includes a number of filtering criteria 34 through 54 and corresponding sub-criteria 56 through 70 that are selected by the user in order to adjust the key frames presented in the key frame area 32. In this example, the filtering criteria 34 through 54 include an "all" criterion 34, an "action" criterion 36, a "classics" criterion 38, a "comedy" criterion 40, a "doc" or documentary criterion 42, a "drama" criterion 44, a "foreign" criterion 46, a "horror" criterion 48, a "sci-fi" criterion 50, a "sports" criterion 52, and a "thriller" criterion 54. In this example, the user has selected the "comedy" criterion 40. As such, the published key frames for users currently viewing video content items in the comedy genre are presented in the key frame area 32.

The sub-criteria 56 through 70 enable the user to further filter the contents of the key frame area 32. In this example, the sub-criteria 56 through 70 include an "all" sub-criterion 56, a "friends" sub-criterion 58, a "neighbors" sub-criterion 60, a "destination" sub-criterion 62, a "local" sub-criterion 64, a "movies" sub-criterion 66, a "television" sub-criterion 68, and a "UGC" sub-criterion 70. When the "all" sub-criterion 56 is selected, the key frames for all users currently viewing video content items matching the selected filtering criterion, which in this example is the "comedy" criterion 40, are presented in the key frame area 32. When the "friends" sub-criterion 58 is selected, the key frames for only those users in a friends or buddy list of the user that are currently viewing video content items from the selected filtering criterion, which in this example is the "comedy" criterion 40, are presented in the key frame area 32. Note that the present invention is not limited to buddy lists. The present invention may utilize buddy lists or any other type of social network having direct and/or indirect relationships between users such as, for example, those provided by social networking websites such as MySpace. When the "neighbors" sub-criterion 60 is selected, the key frames for only those users geographically located within a predefined distance from the user that are currently viewing video content items from the selected filtering criterion, which in this example is the "comedy" criterion 40, are presented in the key frame area 32. When the "destination" sub-criterion 62 is selected, the key frames for only those users that are currently viewing video content items from one or more selected content portals and match the selected filtering criterion, which in this example is the "comedy" criterion 40, are presented in the key frame area 32. The content portals may be, for example, hulu.com, abctv.com, cnn.com, or the like.

When the "local" sub-criterion 64 is selected, the key frames for only those users currently viewing video content items that are accessible locally and match the selected filtering criterion, which in this example is the "comedy" criterion 40, are presented in the key frame area 32. A video content item is accessible locally if a copy of the video content item is stored locally or if a stream of the video content item is accessible. When the "movies" sub-criterion 66 is selected, the key frames for only those users currently viewing movies that match the selected filtering criterion, which in this example is the "comedy" criterion 40, are presented in the key frame area 32. When the "television" sub-criterion 68 is selected, the key frames for only those users currently viewing television content, such as television programs, that match the selected filtering criterion, which in this example is the "comedy" criterion 40, are presented in the key frame area 32. When the "UGC" sub-criterion 70 is selected, the key frames for only those users currently viewing user generated video content items that match the selected filtering criterion, which in this example is the "comedy" criterion 40, are presented in the key frame area 32.

A "tune" button 72 enables the user to tune to a video content item corresponding to a selected key frame. The video content item may be streamed from a peer device of a user that has published the key frame. Alternatively, if the video content item is stored locally or is otherwise locally accessible, playback of the locally accessible video content item corresponding to the selected key frame is initiated. Playback may be initiated from the beginning of the video content item or at a segment corresponding to the selected key frame.

The key frame presentation billboard 30 may also include a bookmarks area 74 including bookmarks for a number of users, user groups, key frames, video content items, or the like. Key frames may be stored as bookmarks by, for example, dragging-and-dropping the key frames from the key frame area 32 to the bookmarks area 74. Users may be bookmarked by, for example, selecting a key frame in the key frame area 32 such that the username of the corresponding user is presented. The username, picture, or similar identifier of the user may be, for example, dragged-and-dropped into the bookmarks area 74 in order to add the corresponding user as a bookmark. If a key frame is stored as a bookmark, the user may select the bookmark in order to start playback of the corresponding video content item, start playback of the corresponding video content item at the segment represented by the bookmarked key frame, download and purchase the corresponding video content item, or the like. If a bookmark is stored for a user, the bookmark may be selected in order to initiate a chat session the bookmarked user, view a profile of the bookmarked user, view key frames published by the user, or the like. If a bookmark is stored for a group of users, the bookmark may be selected in order to initiate a chat session with the group of users, view profiles of the users in the group of users, view key frames published by the users in the group of users, or the like.

The key frame presentation billboard 30 may also include a chat area 76. The user may, for example, drag-and-drop a username, picture, or similar information identifying a user with which the user would like to chat into the chat area 76. In this example, the user may access the usernames, pictures, or similar identifying information by selecting a desired key frame from the key frame area 32. In response, the username, picture, or other identifying information of the user viewing the corresponding video content item is displayed and may be, for example, dragged-and-dropped into the chat area 76. In response, a chat session is initiated with that user. Alternatively, a key frame published by a user may be dragged-and-dropped into the chat area 76 in order to initiate a chat session with the user responsible for publishing the key frame. In a similar fashion, a groups area 78 may be utilized to create groups of users. A chat session may then be initiated with one or more of the groups of users. Also, an events area 80 may be used to create events. For example, an event may be created to view a selected video content item simultaneously with a group of users at a defined date and time.

Figure 6:
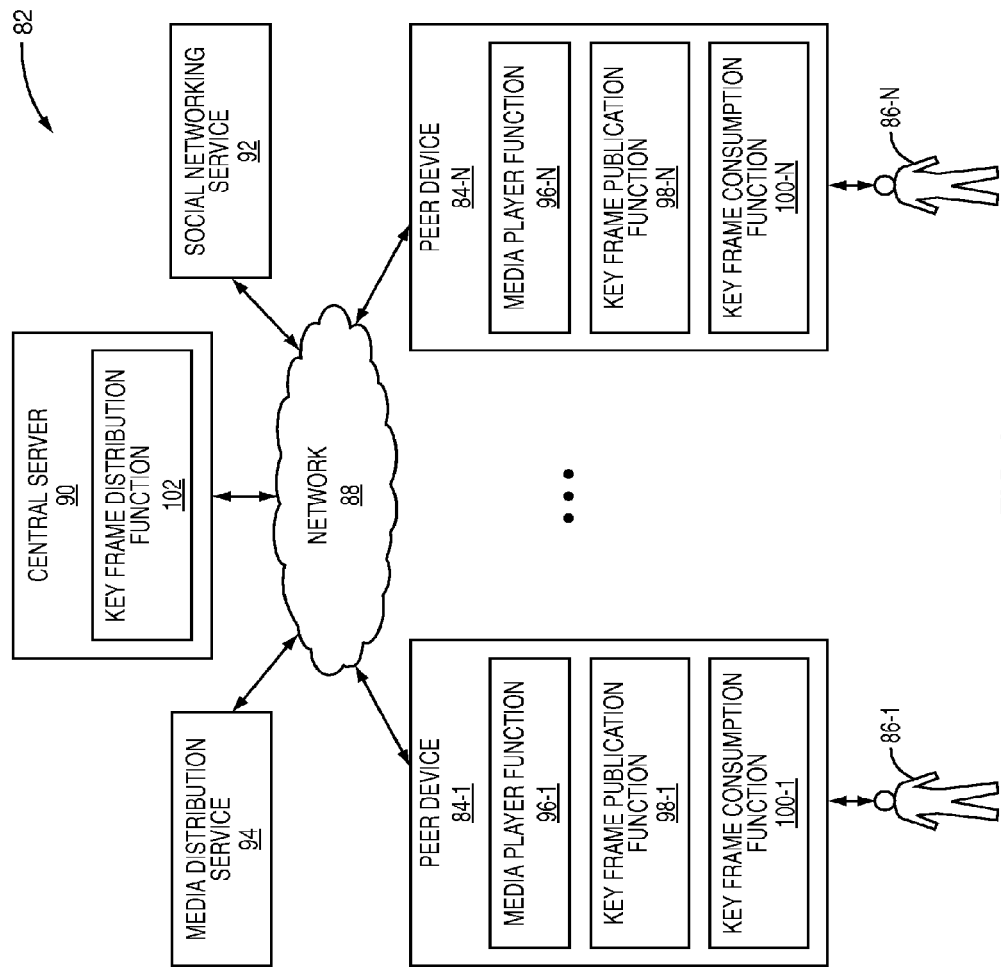
FIG. 6 illustrates a system for publishing key frames of video content items viewed by one or more first users to one or more second users according to a first embodiment of the present invention.

FIG. 6 illustrates a system 82 for publishing key frames of video content items being viewed by first users to second users according to one embodiment of the present invention. In general, the system 82 includes a number of peer devices 84-1 through 84-N having associated users 86-1 through 86-N connected via a network 88. The network 88 may be any type of Wide Area Network (WAN) or Local Area Network (LAN), or any combination thereof, and may include wired components, wireless components, or both wired and wireless components. In addition, the system 82 also includes central server 90, a social networking service 92, and a media distribution service 94.

Each of the peer devices 84-1 through 84-N may be, for example, a personal computer, set-top box, or the like. In general, the peer device 84-1 includes a media player function 96-1, a key frame publication function 98-1, and a key frame consumption function 100-1. Likewise, the peer devices 84-2 through 84-N include media player functions 96-2 through 96-N, key frame publication functions 98-2 through 98-N, and key frame consumption functions 100-2 through 100-N, respectively. The media player function 96-1 may be implemented in software, hardware, or a combination thereof and operates to provide playback of video content items. The video content items may be stored locally at the peer device 84-1, streamed to the peer device 84-1 via a remote service such as, for example, the media distribution service 94, or the like. The video content items may be, for example, movies, television programs, videos available via websites such as cnn.com and abctv.com, user-generated videos such as those available via websites such as youtube.com, or the like.

The key frame publication function 98-1 may also be implemented in software, hardware, or a combination thereof. Further, while shown separately from the media player function 96-1, the key frame publication function 98-1 may alternatively be implemented within the media player function 96-1. The key frame publication function 98-1 generally operates to obtain key frame information for video content items played by the media player function 96-1 and to publish the key frame information to one or more of the other peer devices 84-2 through 84-N, the social networking service 92, or both one or more of the other peer devices 84-2 through 84-N and the social networking service 92.

Lastly, the key frame consumption function 100-1 may also be implemented in software, hardware, or a combination thereof. Again, while the key frame consumption function 100-1 is illustrated separately, the key frame consumption function 100-1 may alternatively be implemented in the media player function 96-1. In addition, while shown separately, the key frame publication and consumption functions 98-1 and 100-1 may be combined. The key frame consumption function 100-1 generally operates to obtain key frames of video content items viewed by one or more of the other users 86-2 through 86-N that are published by corresponding key frame publication functions from the key frame publication functions 98-2 through 98-N. The key frame consumption function 100-1 then presents the published key frames to the user 86-1 and may also enable the user 86-1 to take an action based on the published key frames.

The central server 90 is optional. The central server 90 is implemented as one or more physical servers and includes a key frame distribution function 102. The key frame distribution function 102 may be implemented in software, hardware, or a combination thereof. In one embodiment, the key frame publication functions 98-1 through 98-N publish key frame information for video content items played by the media player functions 96-1 through 96-N, respectively, to the key frame distribution function 102. The key frame distribution function 102 then distributes the key frames to the key frame consumption functions 100-1 through 100-N as appropriate. The key frame distribution function 102 may additionally or alternatively distribute the key frames to the social networking service 92, if desired. In an alternative embodiment, the peer devices 84-1 through 84-N publish key frames by sending the key frame information directly to and from one another or, alternatively, by sending the key frame information to and from one another using the central server 90 as a proxy.

The social networking service 92 may be any type of social networking service such as, for example, a social networking website. The key frame publication functions 98-1 through 98-N may publish key frame information for video content items viewed by the users 86-1 through 86-N at the peer devices 84-1 through 84-N to the social networking service 92. The social networking service 92 may then utilize the published key frames by, for example, inserting the key frames into profiles of the corresponding users 86-1 through 86-N, inserting the key frames in buddy lists such as that shown in FIG. 4, creating and providing key frame presentation billboards such as that shown in FIG. 5, or the like.

The media distribution service 94 may be any type of service from which video content items may be obtained. As an example, the media distribution service 94 may be a service such as the Apple® iTunes® store, which enables purchase or rental and download of various types of video content items including movies, television programs, and music videos. Other exemplary media distribution services are RealNetworks® Rhapsody, Yahoo!® Music, and the like. As another example, the media distribution service 94 may be a website such as cnn.com, abctv.com, youtube.com, or the like. As a final example, the media distribution service 94 may be a service for providing television content such as digital television content, streaming Internet Protocol Television (IPTV) content, or the like. Thus, in one embodiment, the media distribution service 94 may be provided via a cable television network. Further, while only one media distribution service 94 is illustrated, the present invention is not limited thereto. There may be any number of media distribution services 94.

Figure 7:
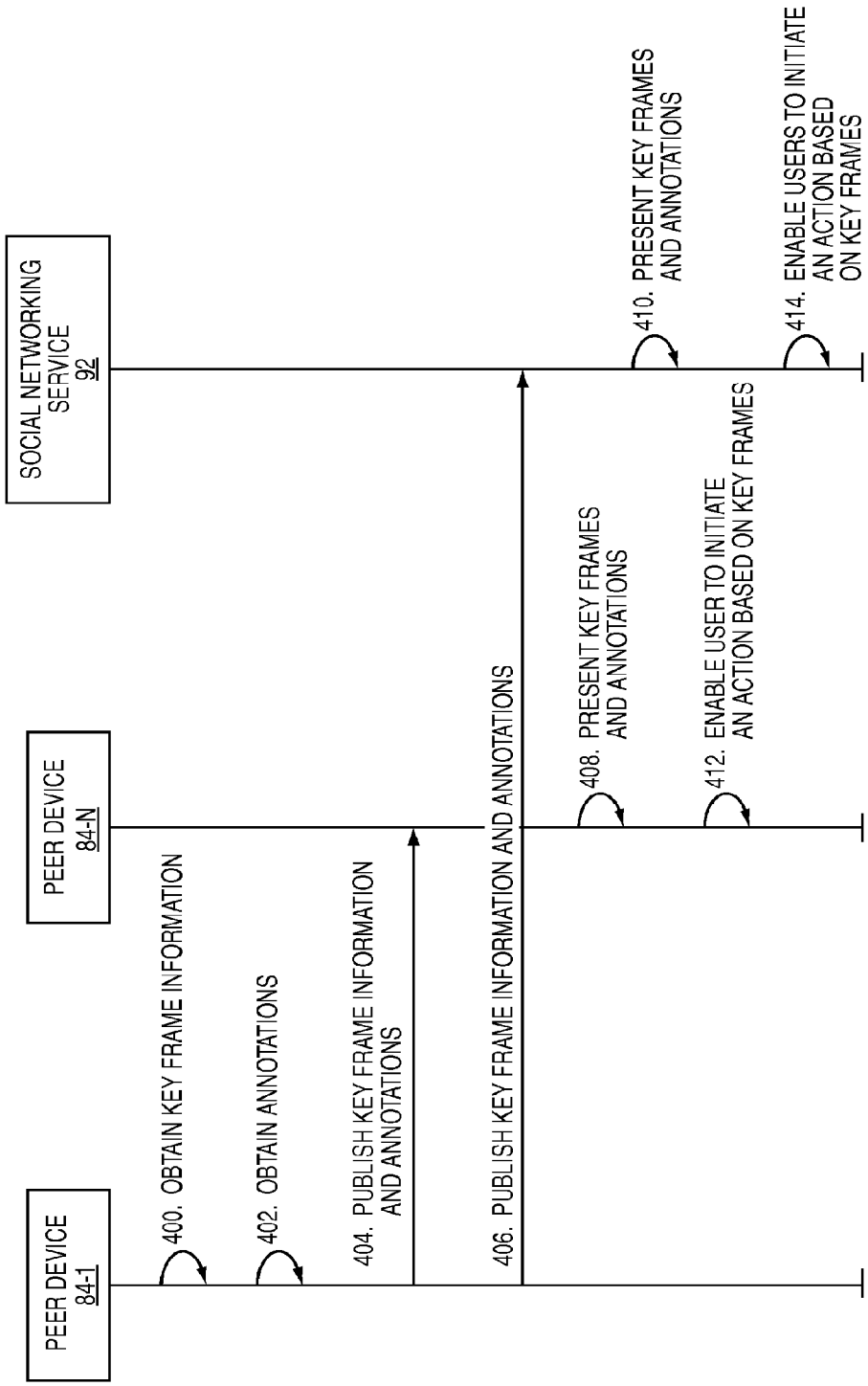
FIG. 7 illustrates the operation of the system of FIG. 6 according to one embodiment of the present invention.

FIG. 7 illustrates the operation of the system 82 of FIG. 6 according to one embodiment of the present invention. In this embodiment, the peer device 84-1, and more specifically, the key frame publication function 98-1, obtains key frame information for a video content item played or to be played by the user 86-1 at the peer device 84-1 (step 400). The key frame information may be key frames of the video content item, references to key frames of the video content item hosted by, for example, the media distribution service 94 (FIG. 6), or information enabling a recipient of the key frame information to obtain the key frames of the video content item from a local copy of the video content item or a stream of the video content item available to the recipient. As discussed above, if the key frame information is or includes the key frames of the video content item, the peer device 84-1, and more specifically the key frame publication function 98-1, may obtain the key frames from a remote source such as, for example, the media distribution service 94, extract the key frames from the video content item prior to or during playback of the video content item, or the like. If the key frame information is or includes references to the key frames at a remote source such as the media distribution service 94, the references to the key frames may be obtained from, for example, the remote source either prior to or during playback of the video content item. Lastly, if the key frame information is or includes information enabling the recipient of the key frame information to extract the key frames from the video content item, this information may be obtained from, for example, a remote source such as the media distribution service 94, the user 86-1, or the like.

Next, the peer device 84-1, and more specifically the key frame publication function 98-1, may obtain annotations for one or more segments of the video content item to be associated with the corresponding key frames (step 402). As an example, the annotations may be created by the user 84-1 prior to playback of the video content item, during a prior playback of the video content item, or during playback of the video content item.

The peer device 84-1, and more specifically the key frame publication function 98-1, then publishes the key frame information and, optionally, any annotations to one or more of the other peer devices 84-2 through 84-N and the social networking service 92 (steps 404 and 406). In this example, the key frame information is published to the peer device 84-N and the social networking service 92. However, the key frame information may be published to any number of the other peer devices 84-2 through 84-N and/or the social networking service 92. In one embodiment, the key frame information is distributed to peer devices from the peer devices 84-2 through 84-N having users that are identified as buddies or friends of the user 86-1 by, for example, a buddy list of the user 86-1.

It should be noted that the key frame information may be published all at once, on a batch-by-batch basis, or on a frame-by-frame basis. More specifically, either prior to or at the beginning of playback of the video content item, the key frame publication function 98-1 of the peer device 84-1 may publish all of the key frame information for the video content item to the peer device 84-N and the social networking service 92. Then, as playback proceeds at the peer device 84-1, timing information may be provided to the peer device 84-N and the social networking service 92 such that the key frame corresponding to the segment of the video content item currently being viewed by the user 86-1 at the peer device 84-1 is presented to the user 86-N of the peer device 84-N and one or more users of the social networking service 92, respectively.

Alternatively, rather than providing the key frame information for the video content item all at once, the key frame publication function 98-1 may publish the key frame information on a batch-by-batch basis. More specifically, in one embodiment, just prior to starting playback of a segment of the video content item or at the start of playback of a number (M) of segments of the video content item, the key frame publication function 98-1 publishes key frames for the M segments of the video content item in a batch process. Thereafter, just prior to or at the start of playback of the next M segments of the video content item, the key frame publication function 98-1 publishes the key frame information for those segments in a batch process. The publication process is repeated to update the key frame information as playback of the video content item proceeds at the peer device 84-1.

As another alternative, the key frame publication function 98-1 may publish the key frame information on a frame-by-frame basis. More specifically, in one embodiment, just prior to starting playback of a segment of the video content item or at the start of playback of the segment of the video content item, the key frame publication function 98-1 publishes the corresponding key frame information for that segment of the video content item. Note that if the key frame information is a reference to the corresponding key frame at a remote source, such as the media distribution service 94, or information enabling the recipient to extract the key frame from a local copy or stream of the video content item, the key frame publication function 98-1 may publish the key frame information such that the peer device 84-N and the social networking service 92 have sufficient time to obtain the needed key frame before the start of the corresponding segment of the video content item. Thereafter, just prior to or at the start of playback of the next segment of the video content item, the key frame publication function 98-1 publishes the key frame information for that segment. The publication process is repeated to update the key frame information as playback of the video content item proceeds at the peer device 84-1.

In response to the publication of the key frame information, the key frame consumption function 100-N of the peer device 84-N presents the key frames for the video content item being viewed by the user 86-1 to the user 86-N at the peer device 84-N (step 408). Similarly, the social networking service 92 presents the key frames for the video content item being viewed by the user 86-1 to one or more associated users (step 410). As discussed above, the key frames are presented such that each key frame for the video content item is presented to the user 86-N of the peer device 84-N and the one or more users of the social networking service 92 while the corresponding segment of the video content item is being viewed by the user 86-1 at the peer device 84-1. The key frame presented to the user 86-N at the peer device 84-N and the one or more users of the social networking service 92 is updated as playback proceeds at the peer device 84-1. The key frames may be presented as part of a user profile of the user 86-1, as part of buddy lists of the user 86-N and/or the one or more users of the social networking service 92 having a pre-established buddy or friend relationship with the user 86-1, as part of a key frame presentation billboard such as that shown in FIG. 5, or the like.

Note that if the published key frame information includes references to the key frames, the key frame consumption function 100-N of the peer device 84-N and the social networking function 92 obtain the key frames from the corresponding source(s), which may be, for example, the media distribution service 94. Likewise, if the published key frame information includes information enabling extraction of the key frames from a local copy or a stream of the video content item, the key frame consumption function 100-N of the peer device 84-N and the social networking service 92 use the information to extract the key frames from the locally accessible copies or streams of the video content item.

The key frame consumption function 100-N of the peer device 84-N then enables the user 86-N to take an action based on the key frames of the video content item (step 412). As discussed above, the user 86-N may be enabled to take actions such as, for example, initiating a chat session with the user 86-1, starting playback of the video content item represented by the key frames, starting playback of the video content item at the segment represented by a selected key frame of the video content item, downloading and purchasing of the video content item, or the like. Likewise, the social networking service 92 enables the one or more users of the social networking service 92 to take an action based on the key frames of the video content item (step 414).

Figure 8:
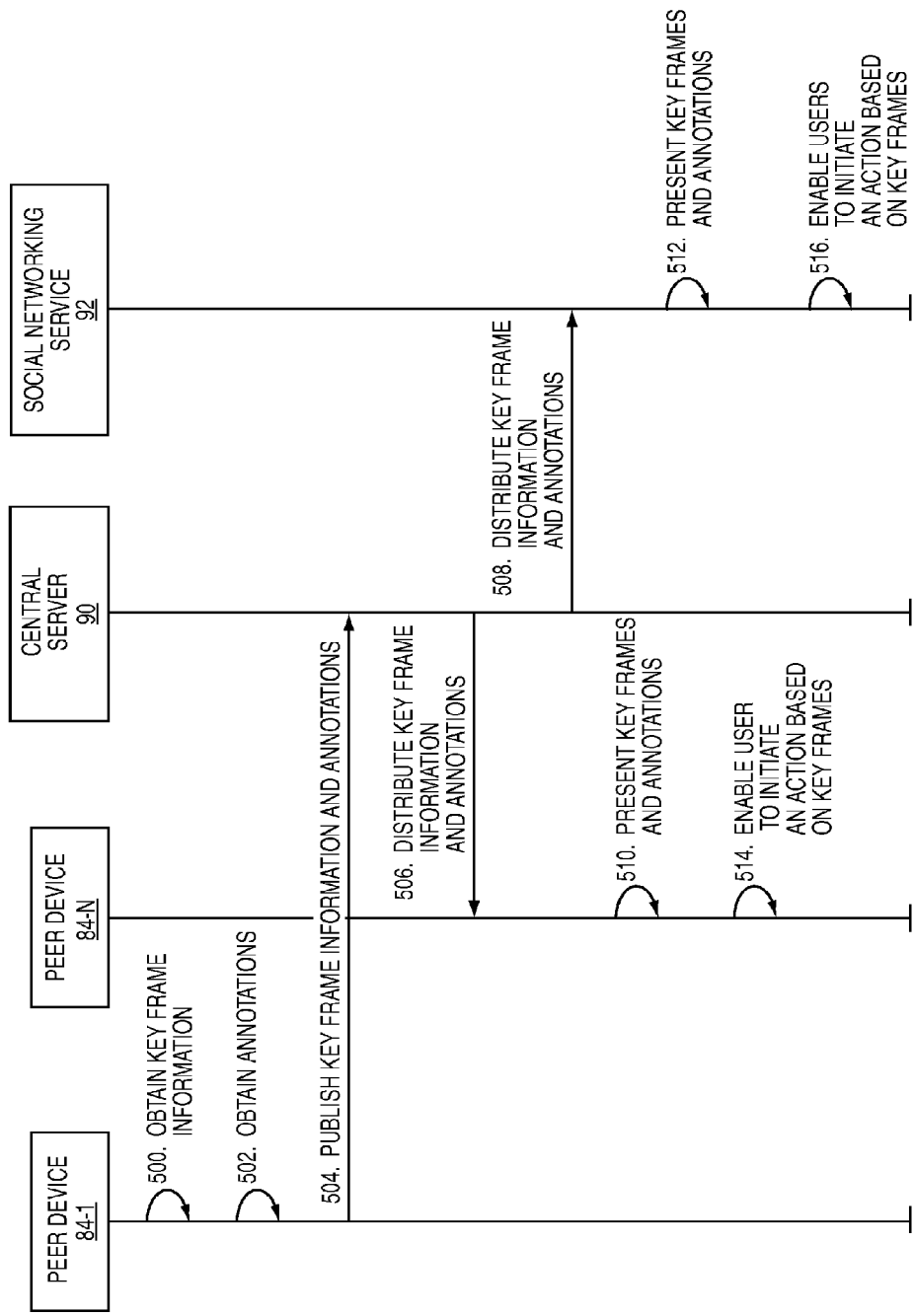
FIG. 8 illustrates the operation of the system of FIG. 6 according to another embodiment of the present invention.

FIG. 8 illustrates the operation of the system 82 of FIG. 6 according to another embodiment of the present invention. This embodiment is substantially the same as that discussed with respect to FIG. 7. However, the key frame information is published via the key frame distribution function 102 of the central server 90 rather than directly to the recipients. In this embodiment, the peer device 84-1, and more specifically the key frame publication function 98-1, obtains key frame information for a video content item played or to be played by the user 86-1 at the peer device 84-1 (step 500). Next, the peer device 84-1, and more specifically the key frame publication function 98-1, may obtain annotations for one or more segments of the video content item to be associated with the corresponding key frames (step 502).

The peer device 84-1, and more specifically the key frame publication function 98-1, then publishes the key frame information and, optionally, any annotations to the central server 90 (step 504). In this example, the key frame distribution function 102 then distributes the published key frame information and any annotations to the peer device 84-N and the social networking service 92 (steps 506 and 508). While in this example the key frame information is distributed to the peer device 84-N, the key frame information may be distributed to any number of the other peer devices 84-2 through 84-N. In one embodiment, the key frame information is distributed to peer devices from the peer devices 84-2 through 84-N having users that are identified as buddies or friends of the user 86-1 by, for example, a buddy list of the user 86-1.

In response, the key frame consumption function 100-N of the peer device 84-N presents the key frames for the video content item being viewed by the user 86-1 to the user 86-N at the peer device 84-N (step 510). Similarly, the social networking service 92 presents the key frames for the video content item being viewed by the user 86-1 to one or more associated users (step 512). As discussed above, the key frames are presented such that each key frame for the video content item is presented to the user 86-N of the peer device 84-N and the one or more users of the social networking service 92 while the corresponding segment of the video content item is being viewed by the user 86-1 at the peer device 84-1. The key frame presented to the user 86-N at the peer device 84-N and the one or more users of the social networking service 92 is updated as playback proceeds at the peer device 84-1. The key frames may be presented as part of a user profile of the user 86-1, as part of buddy lists of the user 86-N and/or the one or more users of the social networking service 92 having a pre-established buddy or friend relationship with the user 86-1, as part of a key frame presentation billboard such as that shown in FIG. 5, or the like.

The key frame consumption function 100-N of the peer device 84-N then enables the user 86-N to take an action based on the key frames of the video content item (step 514). As discussed above, the user 86-N may be enabled to take actions such as, for example, initiating a chat session with the user 86-1, starting playback of the video content item represented by the key frames, starting playback of the video content item at the segment represented by a selected key frame of the video content item, downloading and purchasing of the video content item, or the like. Likewise, the social networking service 92 enables the one or more users of the social networking service 92 to take an action based on the key frames of the video content item (step 516).

Figure 9:
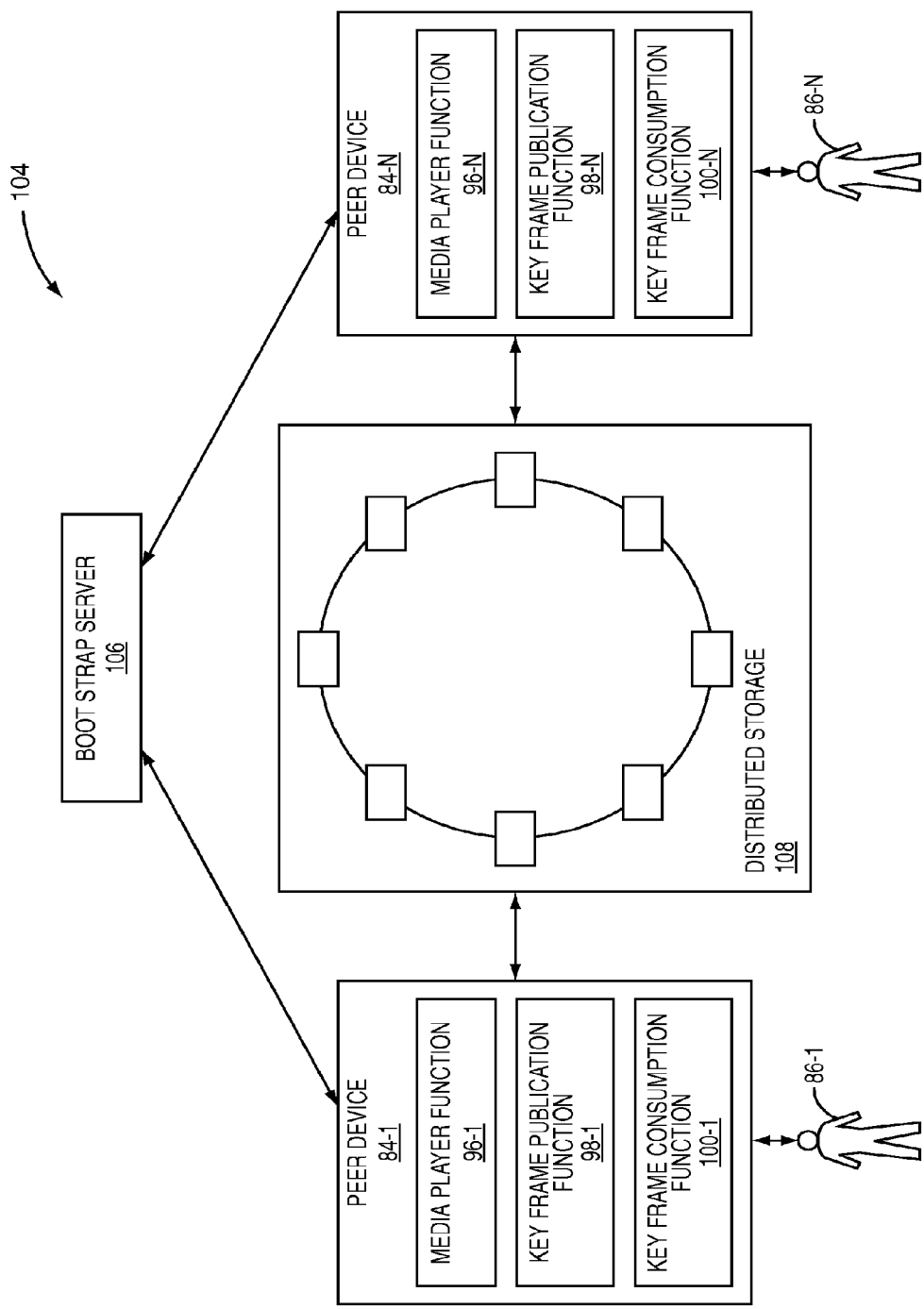
FIG. 9 illustrates a system for publishing key frames of video content items viewed by one or more first users to one or more second users according to a second embodiment of the present invention.

FIG. 9 illustrates a system 104 for publishing key frames of video content items being viewed by first users to second users according to another embodiment of the present invention. In general, the system 104 includes the peer devices 84-1 through 84-N having associated users 86-1 through 86-N. While not illustrated for clarity, the peer devices 84-1 through 84-N are connected via the network 88 (FIG. 6). In addition, the system 104 also includes a boot strap server 106, which is discussed below in more detail.

In general, the system 104 provides a distributed storage 108. More specifically, the distributed storage 108 is a peer-to-peer (P2P) storage mechanism by which key frame information is stored in a distributed manner among the peer devices 84-1 through 84-N. The distributed storage 108 may be any type of structured or unstructured P2P storage mechanism. In one embodiment, the distributed storage 108 is a Distributed Hash Table (DHT) storing key and value (key/value) pairs. As another example, the distributed storage 108 may be a query-based P2P storage mechanism. As discussed below, in one embodiment, identifiers of the users 86-1 through 86-N may be used as keys and the key frame information may be used as the value for the key/value pairs stored by the distributed storage 108. In one embodiment, the boot strap server 106 stores metadata describing video content items being viewed by the users 86-1 through 86-N at the peer devices 84-1 through 84-N. Thus, for example, the user 86-1 may cause the peer device 84-1 to query the boot strap server 106 to identify other users from the users 86-2 through 86-N that are currently viewing video content items matching one or more criteria such as, for example, genre (e.g., comedy, sci-fi, horror, etc.). For example, if a key frame presentation billboard such as that shown in FIG. 5 is used, the peer device 84-1 may query the boot strap server 106 based on the filtering criteria and sub-criterion selected by the user 86-1. In response, the boot strap server 106 returns keys for the key/value pairs in the distributed storage 108 for users currently viewing video content items satisfying the query.

Figure 10:
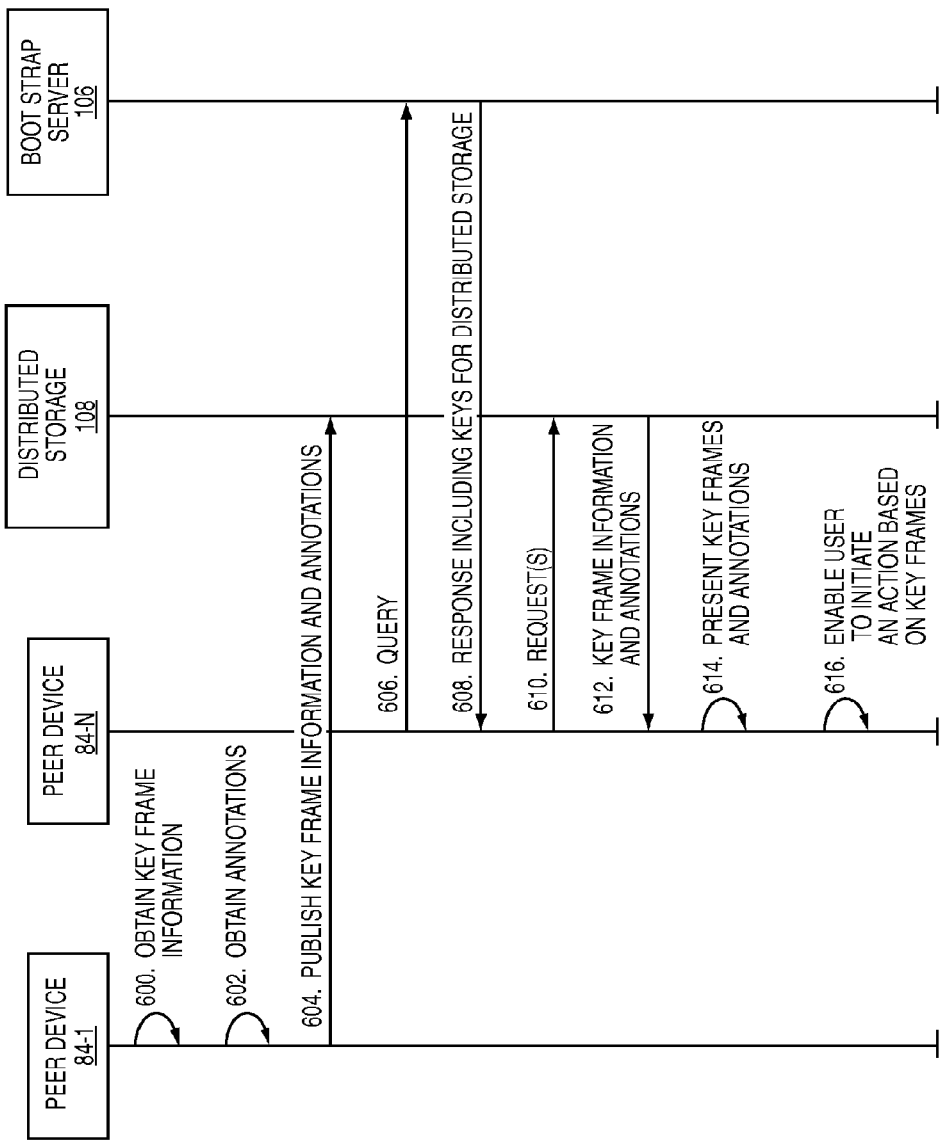
FIG. 10 illustrates the operation of the system of FIG. 9 according to one embodiment of the present invention.

FIG. 10 illustrates the operation of the system 104 of FIG. 9 according to one embodiment of the present invention. In this example, the peer device 84-1 obtains key frame information and optionally annotations for a video content item viewed or to be viewed by the user 86-1 in the manner described above (steps 600 and 602). The peer device 84-1, and more specifically the key frame publication function 98-1, then publishes the key frame information and optionally annotations to the distributed storage 108 (step 604). More specifically, in one embodiment, the key frame information is published to the distributed storage 108 as a value for a key/value pair associated with the user 86-1. The key for the key/value pair may be, for example, a username of the user 86-1. As discussed above, the key frame information may be published all at once such that the value for the key/value pair includes the key frame information for all segments of the video content item being viewed by the user 86-1. Alternatively, the key frame information may be published on a frame-by-frame basis such that the key frame information stored as the value for the key/value pair associated with the user 86-1 includes the key frame information for the segment of the video content item currently being viewed or soon to be viewed by the user 86-1. The annotations may be published as part of the value for the same key/value pair used for the key frame information, published to a separate key/value pair, or published to the boot strap server 106.

In this example, the peer device 84-N then queries the boot strap server 106 in order to identify keys for one or more of the other users 86-1 through 86-N-1 that are currently viewing video content items satisfying one or more defined criteria (step 606). In this example, the video content item being viewed by the user 86-1 at the peer device 84-1 satisfies the criteria defined in the query. As such, the boot strap server 106 returns the key value for a key/value pair associated with the user 86-1 in the distributed storage 108 (step 608). It should be noted that the peer devices 84-1 through 84-N send metadata to the boot strap server 106 describing or identifying the video content items being viewed by the users 86-1 through 86-N. This metadata is used to process queries received by the boot strap server 106.

In an alternative embodiment, rather than querying the boot strap server 106, the peer device 84-N may maintain or have access to a buddy list of the user 86-N. The buddy list includes usernames or other identifiers of users from the users 86-1 through 86-N-1 that have previously been identified as buddies or friends of the user 86-N. The usernames from the buddy list may be used as the keys for the distributed storage 108. Alternatively, the buddy list may include the keys for the users listed in the buddy list. As another alternative, the usernames from the buddy list may be used to query a remote source, such as the boot strap server 106, for the keys of the users listed in the buddy list.

As another alternative, the distributed storage 108 may be an unstructured query-based P2P storage mechanism. As such, rather than querying the boot strap server 106, the peer device 86-N may query the P2P network formed by the peer devices 86-1 through 86-N to identify one or more of the other users 86-1 through 86-N-1 that are currently viewing video content items satisfying one or more defined criteria.

In this example, the key associated with the user 86-1 of the peer device 84-1 is obtained by the peer device 84-N. In response, the key frame consumption function 100-N of the peer device 84-N issues a request to the distributed storage 108 using the key associated with the user 86-1 to obtain the key frame information published by the key frame publication function 98-1 for the video content item being viewed by the user 86-1 (step 610). In response, the key frame information published by the key frame publication function 98-1 for the video content item being viewed by the user 86-1 is obtained from the key/value pair of the user 86-1 stored in the distributed storage 108 and returned to the key frame consumption function 100-N of the peer device 84-N (step 612). If an annotation exists, the annotation may be obtained from the same key/value pair, from a separate key/value pair, or the boot strap server 106 depending on the particular implementation. Note that if the key frame information is published on a frame-by-frame basis, the key frame consumption function 100-N may periodically check the distributed storage 108 for new key frame information.

The key frame consumption function 100-N of the peer device 84-N then presents the key frames of the video content item being viewed by the user 86-1 to the user 86-N at the peer device 84-N (step 614). As discussed above, the key frames are presented such that each key frame is presented to the user 86-N of the peer device 84-N as the corresponding segment of the video content item is being viewed by the user 86-1 at the peer device 84-1. The key frame presented to the user 86-N at the peer device 84-N is updated as playback proceeds at the peer device 84-1. The key frames may be presented as part of a user profile of the user 86-1, as part of a buddy list of the user 86-N, as part of a key frame presentation billboard such as that shown in FIG. 5, or the like.

The key frame consumption function 100-N of the peer device 84-N then enables the user 86-N to take an action based on the key frames of the video content item (step 616). As discussed above, the user 86-N may be enabled to take actions such as, for example, initiating a chat session with the user 86-1, starting playback of the video content item represented by the key frames, starting playback of the video content item at the segment represented by a selected key frame of the video content item, downloading and purchasing of the video content item, or the like.

Note that while a social networking service is not illustrated in FIGS. 9 and 10, the system 104 may additionally or alternatively provide publication of key frames to a social networking service such as that discussed above with respect to FIGS. 6 through 8. More specifically, the social networking service may query the boot strap server 106 to obtain keys for key/value pairs in the distributed storage 108 storing key frame information for desired video content items being viewed by the users 86-1 through 86-N and/or video content items being viewed by desired users from the users 86-1 through 86-N. The social networking service may then request the key frame information from the distributed storage 108 using the keys obtained from the boot strap server 106 to obtain the key frame information as desired.

Figure 11:
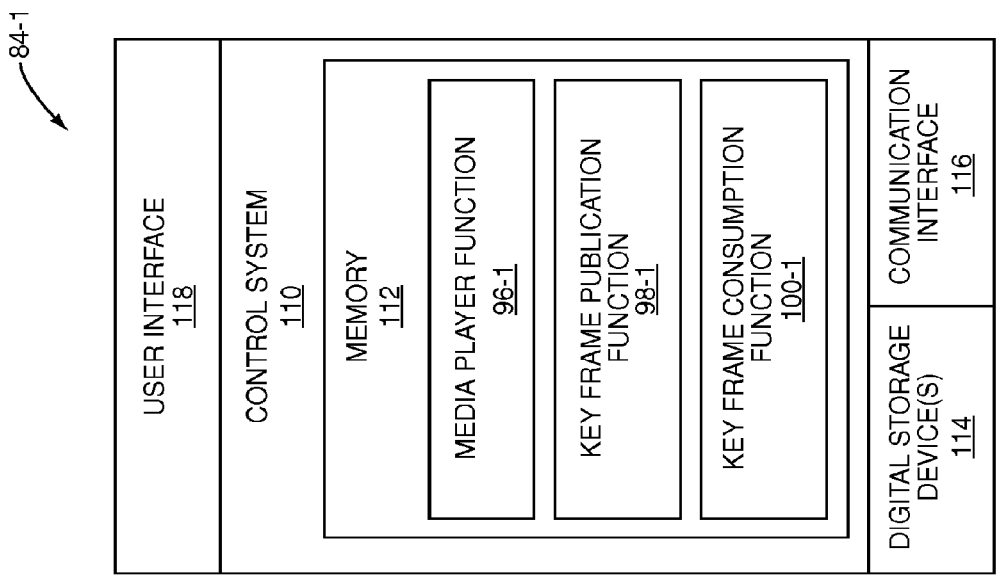
FIG. 11 is a block diagram of an exemplary embodiment of one of the peer devices of FIGS. 6 and 9.

FIG. 11 is a block diagram of the peer device 84-1 according to one embodiment of the present invention. This discussion is equally applicable to the other peer devices 84-2 through 84-N. In general, the peer device 84-1 includes a control system 110 having associated memory 112. In this embodiment, the media player function 96-1, the key frame publication function 98-1, and the key frame consumption function 100-1 are implemented in software and stored in the memory 112. However, the present invention is not limited thereto. The media player function 96-1, the key frame publication function 98-1, and the key frame consumption function 100-1 may each be implemented in software, hardware, or a combination thereof. The peer device 84-1 may also include one or more digital storage devices 114 such as, for example, one or more hard disk drives, one or more removable memory cards, or the like. The one or more digital storage devices 114 may be used to store video content items, a buddy list of the user 86-1, and the like. In addition, for the system 104 of FIGS. 9 and 10 where the distributed storage 108 is utilized for publication of key frame information, a portion of the storage space provided by the one or more digital storage devices 114 may be allocated for the distributed storage 108. Alternatively, a portion of the storage space provided by the memory 112 may be allocated for the distributed storage 108. The peer device 84-1 includes a communication interface 116 communicatively coupling the peer device 84-1 to the network 88 (FIG. 6). Lastly, the peer device 84-1 includes a user interface 118, which may include components such as a display, one or more user input devices, a speaker, or the like.

Figure 12:
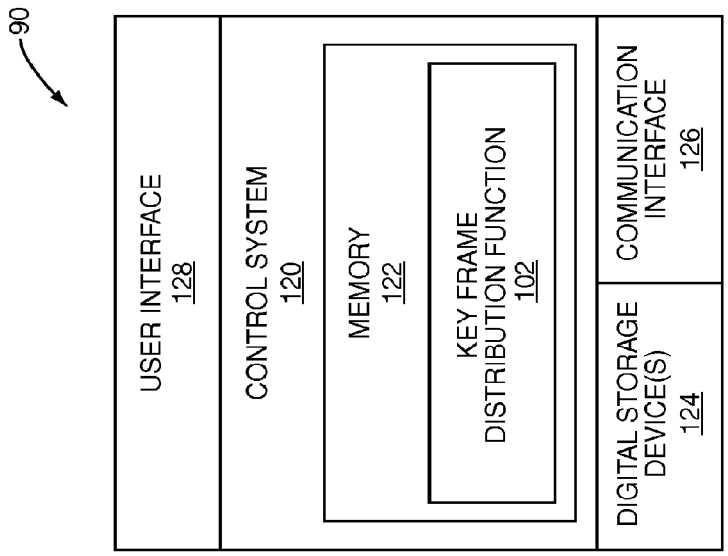
FIG. 12 is a block diagram of an exemplary embodiment of the central server of FIG. 6.

FIG. 12 is a block diagram of the central server 90 of FIGS. 6 and 8 according to one embodiment of the present invention. In general, the central server 90 includes a control system 120 having associated memory 122. In this embodiment, the key frame distribution function 102 is implemented in software and stored in the memory 122. However, the present invention is not limited thereto. The key frame distribution function 102 may be implemented in software, hardware, or a combination thereof. The central server 90 may also include one or more digital storage devices 124 such as, for example, one or more hard disk drives. The central server 90 also includes a communication interface 126 communicatively coupling the central server 90 to the network 88 (FIG. 6). Lastly, the central server 90 may include a user interface 128, which may include components such as a display, one or more user input devices, or the like.

Figure 13:
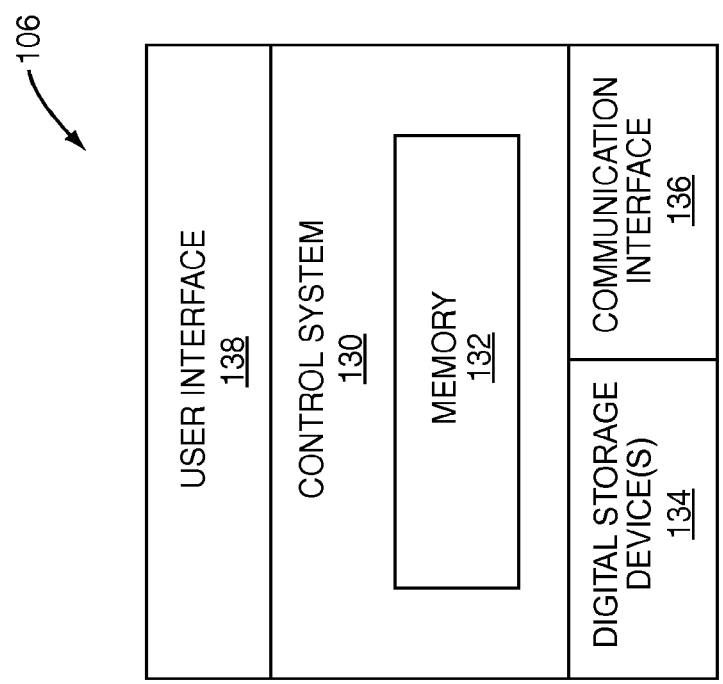
FIG. 13 is a block diagram of an exemplary embodiment of the boot strap server of FIG. 9.

FIG. 13 is a block diagram of the boot strap server 106 of FIGS. 9 and 10 according to one embodiment of the present invention. In general, the boot strap server 106 includes a control system 130 having associated memory 132. The boot strap server 106 may also include one or more digital storage devices 134 such as, for example, one or more hard disk drives. The one or more digital storage devices 134 may be used to store metadata describing or identifying the video content items being viewed by the users 86-1 through 86-N at the peer devices 84-1 through 84-N (FIG. 9). Alternatively, this information may be stored completely or partially in the memory 132. The boot strap server 106 also includes a communication interface 136 communicatively coupling the boot strap server 106 to the peer devices 84-1 through 84-N and optionally a social networking service via a network such as the network 88 (FIG. 6). Lastly, the boot strap server 106 may include a user interface 138, which may include components such as a display, one or more user input devices, or the like.

Figure 14:
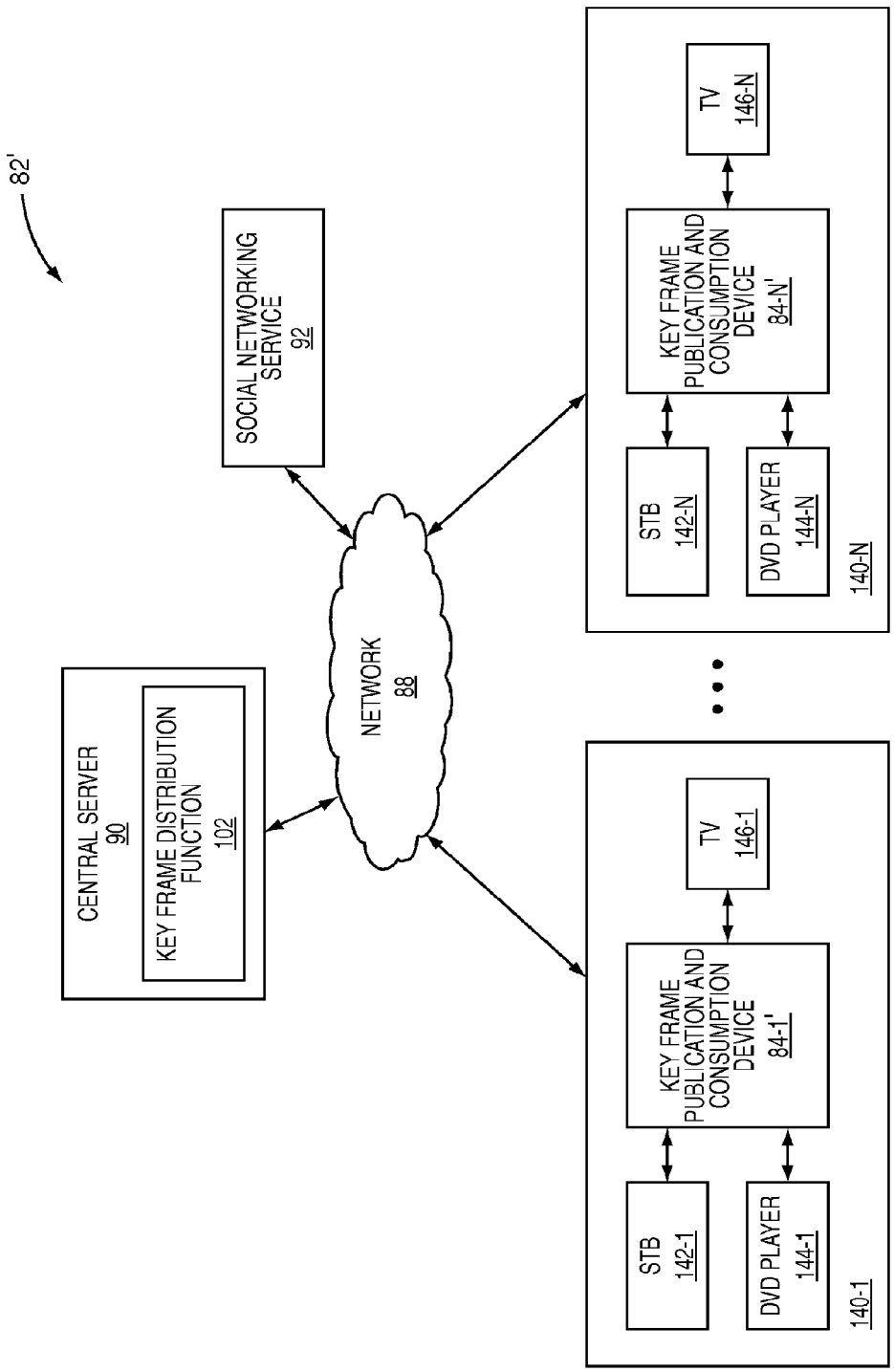
FIG. 14 illustrates a system for publishing key frames of video content items viewed by one or more first users to one or more second users according to a third embodiment of the present invention.

FIG. 14 illustrates an alternative embodiment of the system 82, which is referred to as system 82' in which the peer devices 84-1 through 84-N are replaced with key frame publication and consumption devices 84-1' through 84-N'. In general, the system 82' includes peer systems 140-1 through 140-N. In this example, the peer system 140-1 includes a set-top box (STB) 142-1, a DVD player 144-1, the key frame publication and consumption device 84-1', and a television (TV) 146-1. Note that the STB 142-1 and the DVD player 144-1 are exemplary video playback devices. Any type of video playback device and any number of video playback devices may be used. The key frame publication and consumption device 84-1' is preferably implemented in hardware and is situated between both the STB 142-1 and the DVD player 144-1 and the TV 146-1. The key frame publication and consumption device 84-1' may be interconnected to the STB 142-1, the DVD player 144-1, and the TV 146-1 via audio/video connections such as High-Definition Multimedia Interface (HDMI) connections, Digital Video Interface (DVI) connections, or the like.

In operation, the key frame publication and consumption device 84-1', for example, receives video content from the STB 142-1 or the DVD player 144-1 during playback of a video content item. The video content item may be a television program, movie, or the like provided by the STB 142-1, a movie or similar video content item from a DVD played by the DVD player 144-1, or the like. The key frame publication and consumption device 84-1' obtains key frame information for the video content item and publishes the key frame information to the social networking service 92 and/or one or more of the other key frame publication and consumption devices 84-2' through 84-N' in the manner described above. In one embodiment, the key frame publication and consumption device 84-1', for example, publishes the key frames of video content items viewed by the associated user to one or more of the other key frame publication and consumption devices 84-2' through 84-N' associated with friends or buddies of the associated user identified by, for example, a buddy list of the associated user. In addition to obtaining the key frame information for the video content item, the key frame publication and consumption device 84-1' provides the video content item to the TV 146-1 for presentation to the associated user.

In one embodiment, the key frame information published by the key frame publication and consumption device 84-1' includes key frames of the video content item. In order to obtain the key frames of the video content item, the key frame publication and consumption device 84-1' may extract the key frames from the video content item during playback as the corresponding video content is passed through the key frame publication and consumption device 84-1' to the TV 146-1. Any desired technique for selecting and extracting the key frames may be used. Alternatively, the key frame information published by the key frame publication and consumption device 84-1' may include key frames obtained from one or more remote sources, references to the key frames of the video content item hosted by one or more remote sources, information enabling a recipient device or system to extract the key frames from a local copy or stream of the video content item accessible to the recipient device or system, or the like. Note that in some embodiments, the identity of the video content item may need to be known by the key frame publication and consumption device 84-1'. For example, the identity of the video content item may be needed in order to obtain the key frames or references to the key frames from a remote source. When the identity of the video content item is needed, any desired identification technique may be used. For example, the STB 142-1 or the DVD player 144-1 may provide information identifying the video content item to the key frame publication and consumption device 84-1'. As another example, the messages being sent from the STB 142-1 may be read and used to identify the video content item being played by the STB 142-1.

With respect to consumption of published key frames, the key frame publication and consumption device 84-1', for example, receives key frame information from one or more of the other key frame publication and consumption devices 84-2' through 84-N' for video content items. In response, the key frame publication and consumption device 84-1' presents the key frames to the associated user. In one embodiment, the key frame publication and consumption device 84-1' is controlled by the associated user to present the key frames as a key frame presentation billboard such as that shown in FIG. 5. However, the present invention is not limited thereto. The key frame presentation billboard may be presented as an overlay on top of the video content from the STB 142-1 or the DVD player 144-1 or may be presented in place of the video content item from the STB 142-1 or the DVD player 144-1. The associated user may then take a desired action based on the key frames, as discussed above.

Note that for actions such as initiating a chat session, the chat session may be a voice chat session established via a speaker and microphone in or associated with the key frame publication and consumption device 84-1'. As another example, the chat session may be a text or voice chat session established between devices of the associated users, such as personal computers, mobile telephones, or the like. As for other actions, such as initiating playback of a video content item, the key frame publication and consumption device 84-1' may provide media playback capabilities for downloaded or streamed video content items, control the appropriate video playback device 142-1, 144-1 to provide playback of the desired video content item, or the like. For example, the key frame publication and consumption device 84-1' may direct the STB 142-1 to tune to a particular television channel, initiate playback of a video content item via a Video On Demand (VOD) or Internet Protocol Television (IPTV) service, or the like.

Figure 15:
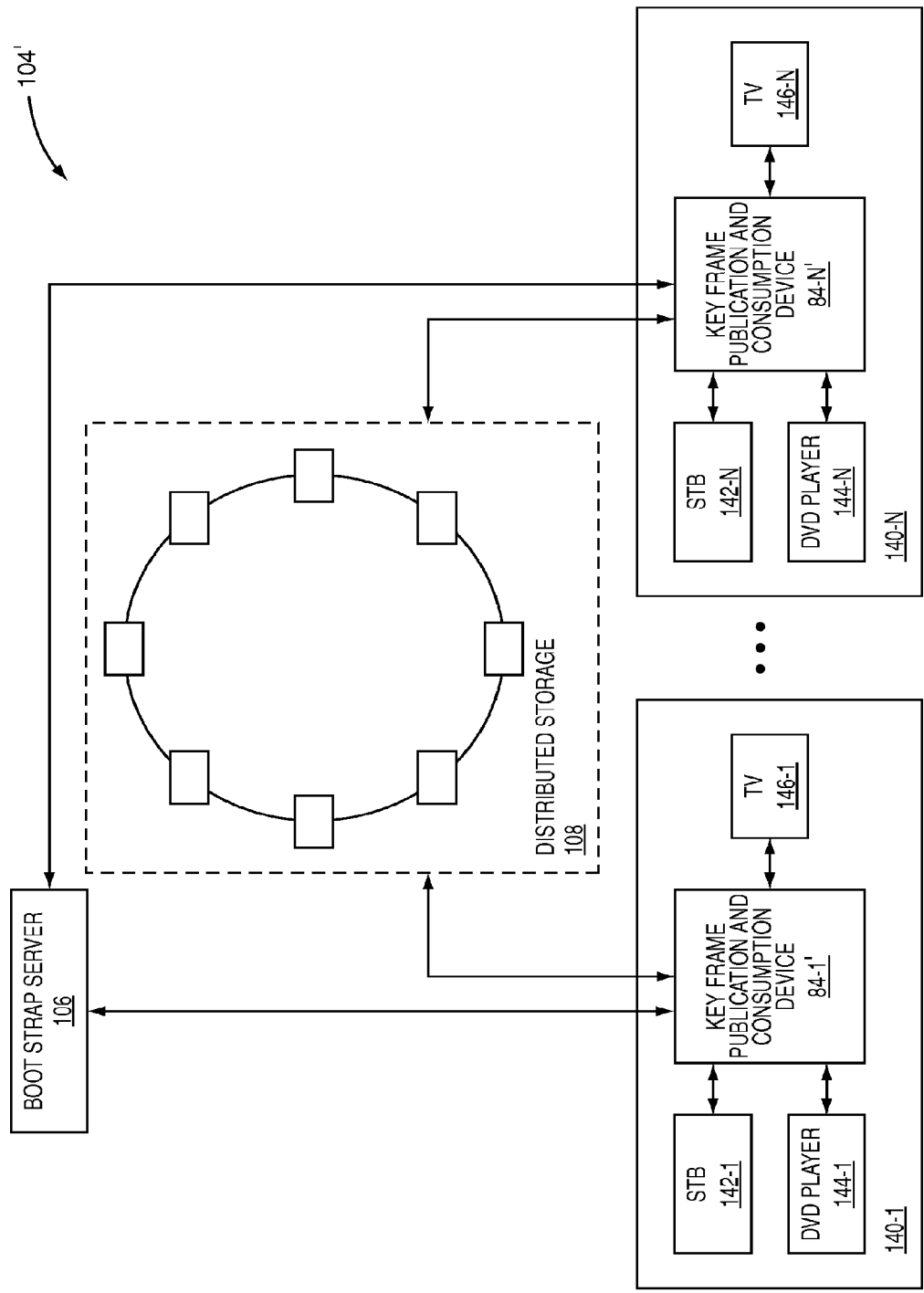
FIG. 15 illustrates a system for publishing key frames of video content items viewed by one or more first users to one or more second users according to a fourth embodiment of the present invention.

FIG. 15 illustrates an alternative embodiment of the system 104, which is referred to as system 104', in which the peer devices 84-1 through 84-N are replaced with the key frame publication and consumption devices 84-1' through 84-N'. This embodiment is substantially the same as that discussed above with respect to FIG. 14. However, key frame publication is provided by the distributed storage 108 and optionally the boot strap server 106, as discussed above with respect to FIGS. 9 and 10.

Figure 16:
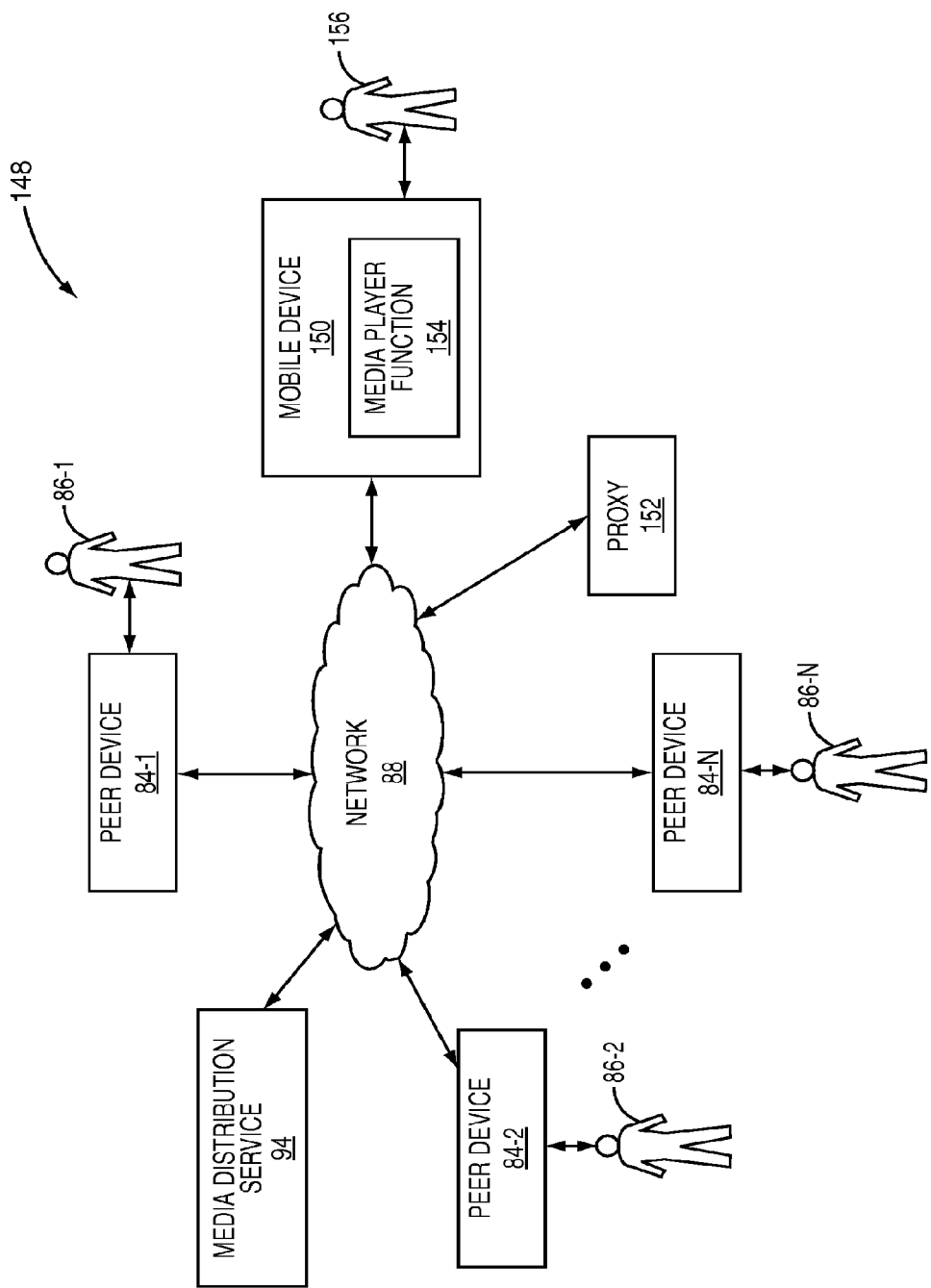
FIG. 16 illustrates a system for publishing key frames of video content items viewed by one or more first users to one or more second users including a key frame proxy for publishing key frames on behalf of a mobile device according to one embodiment of the present invention.

FIG. 16 illustrates a system 148 for publishing key frames of video content items according to another embodiment of the present invention. In general, the system 148 includes the peer devices 84-1 through 84-N. It should be understood that the system 148 may additionally or alternatively include the peer systems 140-1 through 140-N including the key frame publication and consumption devices 84-1' through 84-N'. However, specific discussion of the peer systems 140-1 through 140-N including the key frame publication and consumption devices 84-1' through 84-N' has been omitted for clarity and ease of discussion.

In addition, the system 148 includes a mobile device 150 and a key frame proxy 152, which is hereinafter referred to as proxy 152. The mobile device 150 may be, for example, a mobile telephone such as a mobile smartphone, portable media player, or the like having limited processing capabilities. The mobile device 150 includes a media player function 154, which may be implemented in software, hardware, or a combination thereof. The media player function 154 operates to provide playback of video content items stored locally at the mobile device 150 or streamed to the mobile device 150 from, for example, the media distribution service 94.

The proxy 152 may be implemented in hardware, software, or a combination thereof. The proxy 152 may be a stand-alone device connected to the network 88. Alternatively, the proxy 152 may be a function included in one of the peer devices 84-1 through 84-N, one of the peer devices 84-1 through 84-N associated with a user 156 of the mobile device 150, a central system such as a central server, or the like. As another alternative, the proxy 152 may be implanted on an access point, such as a wireless base station, providing access to the network 88 for the mobile device 150. In operation, the proxy 152 performs key frame publication and, optionally, key frame consumption on behalf of the mobile device 150.

More specifically, in one embodiment, the mobile device 150 first connects to the proxy 152. Again, the proxy 152 may be a stand-alone device connected to the network 88 or may be a function included within or performed by a central system, one of the peer devices 84-1 through 84-N, an access point connecting the mobile device 150 to the network 88, or the like. Next, the proxy 152 emulates a peer device 84 and connects to the distributed network of peer devices 84-1 through 84-N. In addition, while not shown, the proxy 152 may also connect to a social networking service such as the social networking service 92. Next, the user 156 of the mobile device 150 selects a video content item for playback at the mobile device 150. The selected video content item may be a video content item stored locally at the mobile device 150, a video content item accessible from the media distribution service 94, a video content item accessible from one of the peer devices 84-1 through 84-N associated with the user 156, or the like. The mobile device 150 may then provide metadata identifying or describing the selected video content item to the proxy 152. In addition, during playback of the video content item, the mobile device 150 may provide playback control events such as pausing, rewinding, etc. to the proxy 152. Note that if the proxy 152 is implemented on an access point connecting the mobile device 150 to the network 88, the mobile device 150 may not need to provide the metadata identifying or describing the selected video content item and/or the playback control events to the proxy 152. The proxy 152 may determine such information from the information passing to and from the mobile device 150 via the access point.

Either prior to or during playback of the video content item at the mobile device 150, the proxy 152 publishes key frames for the video content item to one or more of the peer devices 84-1 through 84-N and/or a social networking service such as the social networking service 92 in the manner described above. The manner in which the proxy 152 obtains the key frames may vary depending on the particular embodiment.

In a first embodiment, the proxy 152 is implemented on a peer device from the peer devices 84-1 through 84-N that is associated with the user 156 of the mobile device 150, and the selected video content item is stored on the peer device. For example, the selected video content item may be stored on the peer device associated with the user 156 and streamed from the peer device to the mobile device 150 of the user 156. As such, if implemented on the peer device associated with the user 156, the proxy 152 may have access to the selected video content item. If so, the proxy 152 may extract the key frames from the selected video content item stored at the peer device of the user 156 and publish the key frames. Alternatively, the key frames may have already been obtained by the peer device. As such, the proxy 152 has access to the previously obtained key frames for publication.

In a second embodiment, the selected video content item is available for streaming to the mobile device 150 from a remote source such as the media distribution service 94. The proxy 152 may subscribe to the stream, or otherwise request the selected video content item from the media distribution service 94, on behalf of the mobile device 150. The proxy 152 may then stream the video content item to the mobile device 150, extract key frames from the video content item as the video content item is streamed to the mobile device 150, and publish the key frames as described above.

In a third embodiment, the selected video content item is streamed to the mobile device 150 from a remote source such as the media distribution service 94. The proxy 152 subscribes to the same stream of the video content item or another stream of the video content item from the media distribution service 94. The proxy 152 may then extract key frames from the stream of the video content item and publish the key frames as described above. In a fourth embodiment, the proxy 152 searches the distributed network formed by the peer devices 84-1 through 84-N and/or one or more remote sources, such as a media distribution service, for either the selected video content item or key frames for the video content item. The proxy 152 publishes the key frames for the selected video content item in the manner discussed above on behalf of the mobile device 150.

The manner in which the proxy 152 obtains the key frames to publish may be user configurable. Alternatively, the manner in which the proxy 152 obtains the key frames to publish may be dynamically determined by the proxy 152. More specifically, in one embodiment, the proxy 152 first attempts to obtain the key frames of the video content item selected for playback at the mobile device 150 from a local copy of the selected video content item or from a local cache of the key frames for the selected video content item. For example, if the selected video content item is a video content item to be streamed to the mobile device 150 from one of the peer devices 84-1 through 84-N associated with the user 156 and the proxy 152 is implemented on that same peer device, the video content item and is readily accessible by the proxy 152. In addition, if that peer device already has already obtained the key frames for the selected video content item, the proxy 152 also has access to the key frames for the selected video content item. As another example, due to a prior playback of the video content item, the proxy 152 may already have the key frames for the video content item stored locally in cache.

If the selected video content item or the key frames for the selected video content item are not stored locally and the proxy 152 is not implemented on a peer device associated with the user 156 of the mobile device 150, the proxy 152 may then determine whether the selected video content item or the key frames for the selected video content item are available from the peer device associated with the user 156 of the mobile device 150. This may be the situation where the video content item is to be streamed to the mobile device 150 from the peer device associated with the user 156 of the mobile device 150. If the selected video content item is available from the peer device associated with the user 156 of the mobile device 150, the proxy 152 obtains the selected video content item from the peer device and extracts the key frames for publication. If the key frames for the selected video content item are available from the peer device, the proxy 152 may obtain the key frames from the peer device for publication.

If the selected video content item or the key frames for the selected video content item are not stored locally by the proxy 152 or available via the peer device associated with the user 156 of the mobile device 150, the proxy 152 may then query the distributed network of the peer devices 84-1 through 84-N for previously published key frames for the video content item. If previously published key frames for the selected video content item are found, then the proxy 152 obtains and publishes those key frames according to playback of the selected video content item at the mobile device 150.

If key frames for the selected video content item are not found on the distributed network of the peer devices 84-1 through 84-N, the proxy 152 may attempt to contact a remote source of the video content item. In one embodiment, if the selected video content item is to be streamed to the mobile device 150 from a remote source such as the media distribution service 94, the proxy 152 attempts to request the selected video content item from the media distribution service 94 on behalf of the mobile device 150 and cancel the request of the mobile device 150 if necessary. The proxy 152 then receives the selected video content item from the media distribution service 94, streams the selected video content item to the mobile device 150, and extracts key frames from the stream of the selected video content item for publication. Alternatively, the proxy 152 may request the same stream or a separate stream of the video content item from the media distribution service 94, extract key frames from the stream, and publish the key frames. Optimized streaming may be implemented by requesting approximately only those parts of the video content item that are required for extracting the key frames using a technique such as, for example, Hypertext Transfer Protocol (HTTP) range fetches.

If the selected video content item is a local video content item stored by the mobile device 150, the proxy 152 may request the selected video content item from a remote source such as the media distribution service 94. The proxy 152 may then obtain the selected video content item from the media distribution service 94, extract key frames of the selected video content item, and publish the key frames. Alternatively, if key frames for the selected video content item are available via the media distribution service 94, the proxy 152 may obtain the key frames from the media distribution service 94 and publish the key frames.

Note that while the discussion of the proxy 152 focuses on the publication of key frames, the proxy 152 may alternatively publish the other types of key frame information discussed herein. More specifically, the proxy 152 may alternatively publish references to the key frames, information enabling recipients to extract the key frames from locally accessible copies of the video content item, or the like.

Figure 17:
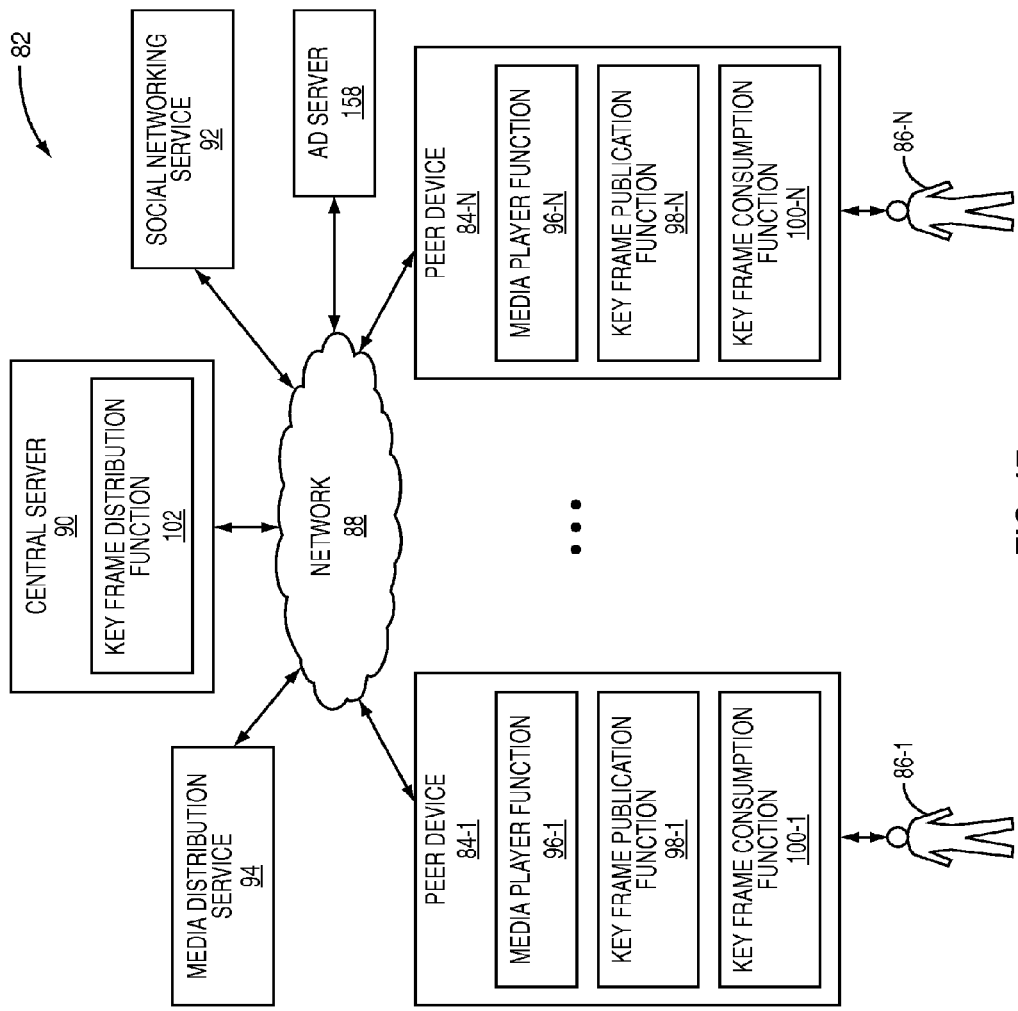
FIG. 17 illustrates a system for publishing key frames of video content items viewed by one or more first users to one or more second users including an ad server for inserting advertisements into key frame sequences according to one embodiment of the present invention.

FIG. 17 illustrates another embodiment of the system 82 including an ad server 158 for inserting advertisements into key frame sequences published for video content items viewed by the users 86-1 through 86-N. Note that the following discussion of the ad server 158 and the insertion of advertisements into key frame sequences is equally applicable to the other key frame publication systems discussed herein. The inclusion of the ad server 158 into the system 82 is exemplary and not intended to limit the scope of the present invention.

FIG. 18 is a flow chart illustrating the operation of the system 82 including the ad server 158 of FIG. 17 according to one embodiment of the present invention. First, key frames for a video content item are identified (step 700). In one embodiment, for ad insertion, the identification of the key frames is preferably performed prior to playback of the video content item. However, the present invention is not limited thereto. The identification of key frames, the identification of highly valued and low value key frames, the identification of product placement key frames, and ad frame or ad insertion may alternatively be performed in real-time as the key frames are published.

As discussed above, the key frames may be identified manually by one or more users or programmatically. For example, a producer of the video content item may manually identify the key frames. As another example, the users 86-1 through 86-N may collaboratively identify the key frames of the video content item. As a final example, the media distribution service 94 or the key frame publication functions 98-1 through 98-N may programmatically identify the key frames using any desired technique.

Next, high value key frames are identified (step 702). As used herein, a high value key frame is a key frame that is most likely to describe a critical scene of the video content item, represent an interesting scene of the video content item, or be valuable to the social network community, i.e., the users 86-1 through 86-N and/or users of the social networking service 92. The high value key frames may be identified programmatically, or algorithmically, using any desired technique. For example, each key frame may be compared to previous and/or subsequent frames of the video content item to determine whether the key frame is part of a high action sequence. If so, the key frame may be identified as a high value key frame. As another example, for each key frame, metadata regarding the key frame or the corresponding segment of the video content item may be analyzed to determine whether the key frame is a high value key frame. For example, if the metadata describes the key frame or the corresponding segment as being critical or interesting, then the key frame may be identified as a high value key frame.

The high value key frames may additionally or alternatively be identified based on ratings or similar input from the users 86-1 through 86-N for the key frames or corresponding segments of the video content items. If the users 86-1 through 86-N have given a particular key frame or segment of the video content item a high rating, then that key frame or corresponding key frame is identified as a high value key frame. Still further, the high value key frames may be identified by the producer of the video content item or based on ratings assigned to the key frames or the corresponding segments of the video content item provided by the producer of the video content item.

In addition to identifying the high value key frames, low value key frames may be identified (step 704). As used herein, low value key frames are key frames that are least likely to describe a critical scene of the video content item, represent an interesting scene of the video content item, or be valuable to the social network community, i.e., the users 86-1 through 86-N and/or users of the social networking service 92. Like the high value key frames, the low value key frames may be identified manually or programmatically, or algorithmically. For example, key frames that are all black or dark may be programmatically identified as low value key frames. As another example, the low value key frames may additionally or alternatively be identified based on ratings from the users 86-1 through 86-N, ratings from the producer of the video content item, or the like.

In addition to high and low value key frames, product placement key frames are identified (step 706). In one embodiment, product placement key frames are key frames around which, or in which, an advertisement for a particular product or type of product may be desirable. For example, a key frame relating to cars may be identified as a product placement key frame for a car advertisement. The product placement key frames may be identified based on, for example, product placement metadata or annotations associated with the key frames or the corresponding segments of the video content item. The product placement metadata or annotations may include, for example, information regarding key products discussed or shown in the key frames or corresponding segments of the video content item. The product placement metadata or annotations may be added by the producer of the video content items, one of the users 86-1 through 86-N that has licensed or otherwise obtained rights to the video content item, or by a group of users, such as the users 86-1 through 86-N, in a collaborative fashion.

Advertisements, such as ad frames, are then inserted into the key frame sequence for the video content item (step 708). More specifically, an advertisement, such as an ad frame, may be inserted before or after each of one or more of the high value key frames identified in step 702 or between successive high value key frames identified in step 702. In addition or alternatively, one or more of the high value ad frames may be modified to include an advertisement. The inserted advertisement may be a text or graphic overlay advertisement that is presented on top of a key frame, text or a graphic advertisement presented into an area of the key frame, or the like. In addition, each of one or more of the low value ad frames identified in step 704 may be replaced with an advertisement, such as an ad frame. The same may be true for any missing or corrupted key frames. The advertisements inserted with respect to the high value and low value key frames are selected by the ad server 158. The advertisements may be selected using any desired advertisement selection technique. For example, the advertisements may be selected based on demographic information and/or user preferences of one or more of the users 86-1 through 86-N to which the key frames will or may be published.

For each of one or more of the product placement key frames identified in step 706, an advertisement, such as an ad frame, may be inserted before or after the product placement key frame. Alternatively, the product placement key frame may be modified to include an advertisement. The advertisements inserted with respect to the product placement key frames are selected by the ad server 158 based on, for example, the product placement metadata or annotations. For example, the ad server 158 may store metadata describing a number of available advertisements and select the advertisements to insert based on a comparison of the metadata describing the available advertisements and the product placement metadata for the product placement key frames. As another example, the advertisement space may be auctioned off to a highest bidder.

It should be noted that steps 700 through 708 may be performed by various components of the system 82. For example, in one embodiment, the high value key frames, low value key frames, and product placement key frames are identified by the ad server 158. More specifically, information needed to identify the high value key frames, low value key frames, and product placement key frames is provided to the ad server 158. This information may include the key frames, user ratings of the key frames or associated segments of the video content item, producer ratings of the key frames or associated segments of the video content item, metadata or annotations for the key frames or corresponding segments of the video content item such as the product placement metadata and annotations, and the like. The ad server 158 then identifies the high value key frames, the low value key frames, and the product placement key frames. The ad server 158 may then select advertisements to insert into the key frame sequence for the video content item. The selected advertisements may then be inserted into the key frame sequence at the ad server 158, the peer device from the peer devices 84-1 through 84-N publishing the key frames, one or more peer devices from the peer devices 84-1 through 84-N consuming the key frames, or the social networking service 92.

As another example, the high value key frames, low value key frames, and product placement key frames may be identified by, for example, the key frame publication function 98-1 of the peer device 84-1 prior to publication of the key frames. The ad server 158 may then be used to select advertisements to insert into the key frame sequence as discussed above. The advertisements may be inserted by the key frame publication function 98-1 of the peer device 84-1. Alternatively, advertisements may be inserted by the key frame consumption function of one or more of the other peer devices 84-2 through 84-N to which the key frames are published. Similarly, if the key frames are published to the social networking service 92, the advertisements may be inserted by the social networking service 92.

FIG. 19 graphically illustrates the identification and insertion of advertisements into an exemplary key frame sequence according to one embodiment of the present invention. In this example, the advertisements are ad frames. However, the present invention is not limited thereto. As illustrated, the key frame sequence includes eight key frames (Key Frame 1 through Key Frame 8). Key Frames 5 and 6 are identified as high value key frames, Key Frame 4 is identified as a low value key frame, and Key Frame 1 is identified as a product placement key frame. As such, an ad frame for an appropriate product or service is selected and inserted into the key frame sequence after Key Frame 1. Note that the key frames are each assigned to a particular segment of the video content item. As such, in order to maintain proper alignment of the key frames, the inserted ad frame may be allocated an amount of time at the end of the segment of the video content item for Key Frame 1, an amount of time at the beginning of the video content item for Key Frame 2, or an amount of time beginning prior to the end of the segment of the video content item for Key Frame 1 and extending until after the beginning of the segment of the video content item for Key Frame 2. In a similar manner, an ad frame is selected by the ad server 158 and inserted between Key Frames 5 and 6, which are identified as high value key frames. Key Frame 4, which is identified as a low value key frame, is replaced by an ad frame selected by the ad server 158.

FIG. 20 illustrates another embodiment of the system 104 (FIG. 9) which includes an ad server 160. As discussed above, in the system 104, the peer devices 84-1 through 84-N publish key frame information via the distributed storage 108. In this embodiment, the ad server 160 is enabled to modify or replace the key frame information published to the distributed storage 108 in order to insert advertisements into the key frame sequences published by the peer devices 84-1 through 84-N.

More specifically, the ad server 160 communicates with the boot strap server 106 and queries the distributed storage 108 to obtain a set of highly valued producers. Highly valued producers are peer devices from the peer devices 84-1 through 84-N producing or publishing key frames that are consumed or predicted to be consumed by a larger number of other peer devices from the peer devices 84-1 through 84-N and/or users of a social networking service. Note that while a social networking service is not shown in FIG. 20, the system 104 may also include a social networking service to which key frames may be published. Once the highly valued producers are identified, the key frame information published by those highly valued producers that is stored in the distributed storage 108 is modified by the ad server 160 in order to insert advertisements into the key frame sequences published by the highly valued producers. The modification may also include injecting additional metadata such as, for example, a callback Uniform Resource Locator (URL) that enables the ad server 160 to measure advertisement impressions.

FIG. 21 is a flow chart illustrating the operation of the ad server 160 of FIG. 20 according to one embodiment of the present invention. In this embodiment, the ad server 160 periodically selects a set of highly valued producers, selects advertisements to insert into the key frame sequences published by the highly valued producers, and then modifies the key frame information published by the highly valued producers and stored in the distributed storage 108 to include the selected advertisements.

More specifically, the ad server 160 first determines consumer interest (step 800). In one embodiment, in order to determine consumer interest, the ad server 160 joins the distributed network formed by the peer devices 84-1 through 84-N and passively listens for queries to determine which consumer criteria or "tunings" are popular. For example, if key frames are presented using key frame presentation billboards such as that shown in FIG. 5, the users consuming published key frames are enabled to select filtering criteria and sub-criteria to control which key frames are presented to the users via a key frame presentation billboard at the peer devices from the peer devices 84-1 through 84-N. In response to the selection of filtering criteria and sub-criteria by the users 86-1 through 86-N, the peer devices 84-1 through 84-N issue queries to the boot strap server 106 to identify the keys needed to obtain the appropriate key frame information from the distributed storage 108. The ad server 160 may monitor these queries in order to determine which criteria are popular. In addition or alternatively, the ad server 160 may communicate with the peer devices 84-1 through 84-N and/or the boot strap server 106 to obtain query metrics reflecting interests of the users 86-1 through 86-N. In one embodiment, the popular criteria for queries issued by the peer devices 84-1 through 84-N, query metrics, or both may be applied against a taxonomy, ontology, or similar classification data structure to determine the current interests of the users 86-1 through 86-N. Note that the above techniques for determining consumer interest are exemplary and are not intended to limit the scope of the present invention.

Next, the ad server 160 selects one or more highly valued producers (step 802). Again, highly valued producers are users from the users 86-1 through 86-N, or peer devices from the peer devices 84-1 through 84-N, that publish key frames or are predicted to publish key frames matching the current interests of the users 86-1 through 86-N to a large number of consumers. The consumers are other users from the users 86-1 through 86-N, or other peer devices from the peer devices 84-1 through 84-N, and/or users of a social networking service that consume published key frames.

More specifically, the ad server 160 may first query the boot strap server 106, or alternatively the distributed network formed by the peer devices 84-1 through 84-N, to identify producers associated with the one or more consumer interests identified in step 800. Next, the ad server 160 qualifies the producers based on their interest stability, i.e., how long they have been publishing key frame information associated with a corresponding consumer interest. Consumer interest stability may be determined using information such as playback start time of a video content item matching the consumer interest, current playback location within the video content item, a playback length of the video content item, or the like. If available, the ad server 160 may also examine a profile of the producer, a viewing history of the producer, a viewing schedule or playlist of the producer, or the like to determine whether the producer is likely to continue playback of the current video content item and/or expected to begin playback of an associated video content item in the future.

Next, the ad server 160 selects advertisements to insert in the key frame sequences published by the highly valued producers (step 804). The ad server 160 may use any desired technique for selecting advertisements based on consumer interests. Advertisers may register their advertisements with the ad server 160 along with information describing a target audience, associated consumer interests, or the like. The advertisements may be, for example, ad frames to insert into a key frame sequence or replace key frames in a key frame sequence, text-based, graphic, or video advertisements to insert in a key frame sequence or replace key frames in a key frame sequence, text-based or graphic advertisements to be overlaid upon key frames or inserted into existing or artificially created free space in the key frames, or the like.

Once the advertisements are selected, the ad server 160 modifies the key frame information published by the highly valued producers and stored in the distributed storage 108 to insert the selected advertisements into the published key frame sequences (step 806). Note that in one embodiment, the ad server 160 may be required to have appropriate credentials before being allowed to modify the key frame information stored in the distributed storage 108. For example, the boot strap server 106 may provide session specific public/private key information to the ad server 160 for the highly valued producers if the ad server 160 has permission to modify the key frame information stored in the distributed storage 108.

In one embodiment, if the published key frame information includes the key frames and the selected advertisements are to be inserted into free space in the key frames or overlaid upon the key frames, the ad server 160 may obtain the published key frames from the distributed storage 108 and modify the key frames to include the selected advertisements. The modified key frames may then be stored in the distributed storage 108. If the published key frame information includes the key frames and the selected advertisements are to be inserted into the key frame sequences or to replace key frames in the key frame sequences, then the ad server 160 replaces the published key frames with the advertisements as needed.

In another embodiment, if the key frame information stored in the distributed storage 108 includes references to the key frames and the advertisements are to be inserted by modifying the key frames, then the ad server 160 may obtain the key frames using the references, modify the key frames to include the advertisements, store the modified key frames, and modify the key frame information in the distributed storage 108 to replace the references to the key frames with references to the modified key frames at the ad server 160. If the advertisements are to be inserted into the key frame sequences or replace key frames in the key frame sequences, then the ad server 160 replaces the references to the key frames stored in the distributed storage 108 with references to the selected advertisements as needed.

Note that once the key frame information is modified to insert the selected advertisements in the key frame sequences, the key frame information may be prevented from being updated by the corresponding peer device from the peer devices 84-1 through 84-N for a predetermined amount of time, a predetermined number of fetches, or the like to ensure that the advertisement is presented for a desired amount of time. Also note that if the peer devices 84-1 through 84-N are unable to support flash crowds requesting content stored in the distributed storage 108, the peer devices 84-1 through 84-N storing the key frame information for the highly valued producers may request support from a proxy or central server associated with the distributed network formed by the peer devices 84-1 through 84-N, a super node in the distributed network formed by the peer devices 84-1 through 84-N, or the like.

Those skilled in the art will recognize improvements and modifications to the preferred embodiments of the present invention. All such improvements and modifications are considered within the scope of the concepts disclosed herein and the claims that follow.

The invention claimed is:

1. A method comprising:
 obtaining, by a first peer device, key frame information for each of a plurality of key frames of a video content item; and
 publishing, by the first peer device, the key frame information such that each key frame of the plurality of key frames of the video content item is presented to one or more second devices while a corresponding segment of the video content item is rendered by the first peer device.

2. The method of claim 1 wherein the key frame information comprises the plurality of key frames, and obtaining the key frame information comprises at least one extracting the plurality of key frames from the video content item during playback of the video content item at the first peer device and extracting the plurality of key frames from the video content item prior to playback of the video content item at the first peer device.

3. The method of claim 1 wherein the key frame information comprises information identifying a plurality of frames of the video content item as the plurality of key frames, and obtaining the key frame information comprises obtaining the information identifying the plurality of frames of the video content item as the plurality of key frames.

4. The method of claim 1 wherein publishing the key frame information comprises:
 publishing the key frame information for the plurality of key frames all at once; and
 subsequently publishing timing information such that each key frame of the plurality of key frames is presented to the one or more second devices as the corresponding segment of the video content item is rendered by the first peer device.

5. The method of claim 1 wherein publishing the key frame information comprises publishing the key frame information to one or more second devices via at least one of a network and a centralized social networking service.

6. The method of claim 5 wherein the centralized social networking service is a social networking website.

7. The method of claim 1 wherein publishing the key frame information comprises publishing the key frame information to a central system that distributes the key frame information to at least one of a group consisting of: a centralized social networking service with which one or more users are registered, and the one or more second devices are associated with the one or more users.

8. The method of claim 1 wherein publishing the key frame information comprises publishing the key frame information via distributed storage provided by a distributed network formed by a plurality of peer devices including the first peer device.

9. The method of claim 1 further comprising inserting an advertisement into the plurality of key frames.

10. The method of claim 9 wherein inserting an advertisement into the plurality of key frames comprises one of a group consisting of:
 inserting an advertisement between two successive key frames from the plurality of key frames;
 replacing a key frame from the plurality of key frames with an advertisement; and
 modifying a key frame from the plurality of key frames to insert an advertisement into the key frame.

11. The method of claim 9 wherein inserting an advertisement into the plurality of key frames comprises:
 identifying a high value key frame from the plurality of key frames; and
 inserting an advertisement into the plurality of key frames at a location selected from a group consisting of: before the high value key frame, after the high value key frame, and within the high value key frame.

12. The method of claim 9 wherein inserting an advertisement into the plurality of key frames comprises:
 identifying a low value key frame from the plurality of key frames; and replacing the low value key frame with an advertisement.

13. The method of claim 9 wherein inserting an advertisement into the plurality of key frames comprises:
identifying a key frame from the plurality of key frames that is desirable for a product placement advertisement; and
inserting the product placement advertisement into the plurality of key frames at a location selected from a group consisting of: before the key frame identified as being desirable for the product placement advertisement, after the key frame identified as being desirable for the product placement advertisement, and within the key frame identified as being desirable for the product placement advertisement.

14. The method of claim 1 wherein publishing the key frame information comprises publishing the key frame information via distributed storage provided by a distributed network formed by a plurality of peer devices including the first peer device, and the method further comprises modifying the key frame information stored in the distributed storage such that an advertisement is inserted into the plurality of key frames.

15. The method of claim 14 wherein modifying the key frame information stored in the distributed storage such that an advertisement is inserted into the plurality of key frames comprises:
determining one or more consumer interests of a plurality of second users comprising users of the one or more second devices consuming key frame information published via the distributed storage for video content items being viewed by a plurality of first users including a first user of the first peer device;
identifying the first user as a highly valued producer;
selecting an advertisement to insert into the plurality of key frames for the video content item being viewed by the first user; and
modifying the key frame information stored in the distributed storage by the first peer device such that the advertisement is inserted into the plurality of key frames published for the video content item being viewed by the first user.

16. The method of claim 1 wherein the first peer device is a stand-alone device connected between at least one video playback device and a display device, and the method further comprises:
receiving the video content item at the stand-alone device from one of the at least one video playback device; and
providing the video content item from the stand-alone device to the display device for presentation to the first user.

17. A method comprising:
obtaining key frame information published by a first peer device for each of a plurality of key frames of a video content item; and
presenting the plurality of key frames to one or more second devices such that each key frame of the plurality of key frames is presented to the one or more second devices while a corresponding segment of the video content item is being rendered by the first peer device.

18. The method of claim 17 wherein the key frame information comprises a reference to the plurality of key frames at a remote source, and presenting the plurality of key frames comprises obtaining the plurality of key frames from the remote source using the reference.

19. The method of claim 17 wherein the key frame information comprises, for each key frame from the plurality of key frames, a reference to the key frame at a remote source, and presenting the plurality of key frames comprises obtaining the plurality of key frames from the remote source using the references.

20. The method of claim 17 wherein obtaining the key frame information comprises:
obtaining the key frame information for the plurality of key frames all at once; and
repeatedly obtaining timing information published by the first peer device as the video content item is rendered, wherein the timing information is indicative of a playback position of the video content item;
wherein presenting the plurality of key frames comprises presenting the plurality of key frames based on the timing information such that each key frame of the plurality of key frames is presented to the one or more second devices while the corresponding segment of the video content item is rendered by the first peer device.

21. The method of claim 17 wherein obtaining the key frame information comprises obtaining the key frame information on a frame-by-frame basis such that, for each segment of the video content item, the key frame information for a key frame from the plurality of key frames for the segment of the video content item is obtained at a time that enables the key frame to be presented to the one or more second devices while the segment of the video content item is rendered by the first peer device.

22. The method of claim 17 wherein for each second device of one or more second devices:
obtaining the key frame information comprises obtaining the key frame information at the second device; and
presenting the plurality of key frames comprises presenting the plurality of key frames to the one or more second devices.

23. The method of claim 17 wherein:
obtaining the key frame information comprises obtaining the key frame information at a social networking service; and
presenting the plurality of key frames comprises presenting the plurality of key frames via the social networking service.

24. A method comprising:
obtaining, by a key frame proxy, key frame information for each of a plurality of key frames of a video content item; and
publishing, by the key frame proxy, the key frame information on behalf of a first device such that each key frame of the plurality of key frames of the video content item is presented to one or more second devices while a corresponding segment of the video content item is rendered by the first device.

25. The method of claim 24 wherein the key frame information comprises the plurality of key frames, and obtaining the key frame information comprises extracting the plurality of key frames from the video content item.

26. The method of claim 24 wherein the key frame information comprises the plurality of key frames, and obtaining the key frame information comprises obtaining the plurality of key frames from a remote source.

27. The method of claim 24 wherein the key frame information comprises information identifying a plurality of frames of the video content item as the plurality of key frames, and obtaining the key frame information comprises obtaining the information identifying the plurality of frames of the video content item as the plurality of key frames.

28. The method of claim 24 further comprising:
receiving, by the key frame proxy, the video content item;

wherein the key frame information comprises the plurality of key frames, and obtaining the key frame information comprises extracting the plurality of key frames from the video content item.

29. The method of claim 28 further comprising providing, by the key frame proxy, the video content item to the first device.

30. A tangibly embodied computer readable storage medium including instructions which, when executed by a processor, cause the following steps to be performed:
obtaining, by a first peer device, key frame information for each of a plurality of key frames of a video content item; and
publishing, by the first peer device, the key frame information such that each key frame of the plurality of key frames of the video content item is presented to one or more second devices while a corresponding segment of the video content item is being rendered by the first peer device.

31. A peer device comprising:
an obtaining component configured to obtain key frame information for each of a plurality of key frames of a video content item; and
a publishing component configured to publish the key frame information such that each key frame of the plurality of key frames of the video content item is presented to one or more second devices while a corresponding segment of the video content item is being rendered by the peer device.

32. The peer device of claim 31 wherein the key frame information comprises the plurality of key frames, and in obtaining the key frame information, the obtaining component is further configured to at least one of extract the plurality of key frames from the video content item during playback of the video content item at the first peer device and extract the plurality of key frames from the video content item prior to playback of the video content item at the first peer device.

33. The peer device of claim 31 wherein the key frame information comprises information identifying a plurality of frames of the video content item as the plurality of key frames, and in obtaining the key frame information, the obtaining component is further configured to obtain the information identifying the plurality of frames of the video content item as the plurality of key frames.

34. The peer device of claim 31 wherein in publishing the key frame information, the publishing component is further configured to:
publish the key frame information for the plurality of key frames all at once; and
subsequently publish timing information such that each key frame of the plurality of key frames is presented to the one or more second devices as the corresponding segment of the video content item is rendered by the first peer device.

35. The peer device of claim 31 wherein in publishing the key frame information, the publishing component is further configured to publish the key frame information to one or more second devices via at least one of a network and a centralized social networking service.

36. The peer device of claim 35 wherein the centralized social networking service is a social networking website.

37. The peer device of claim 31 wherein in publishing the key frame information, the publishing component is further configured to publish the key frame information to a central system that distributes the key frame information to at least one of a group consisting of: a centralized social networking service with which one or more users are registered, and the one or more second devices are associated with the one or more users.

38. The peer device of claim 31 wherein in publishing the key frame information, the publishing component is further configured to publish the key frame information via distributed storage provided by a distributed network formed by a plurality of peer devices including the first peer device.

39. The peer device of claim 31 wherein the publishing component is further configured to enable insertion of an advertisement into the plurality of key frames.

40. The peer device of claim 39 wherein in enabling insertion of an advertisement into the plurality of key frames, the publishing component is configured to enable one of a group consisting of:
inserting an advertisement between two successive key frames from the plurality of key frames;
replacing a key frame from the plurality of key frames with an advertisement; and
modifying a key frame from the plurality of key frames to insert an advertisement into the key frame.

41. The peer device of claim 39 wherein in enabling insertion of an advertisement into the plurality of key frames, the publishing component is configured to enable:
identifying a high value key frame from the plurality of key frames; and
inserting an advertisement into the plurality of key frames at a location selected from a group consisting of: before the high value key frame, after the high value key frame, and within the high value key frame.

42. The peer device of claim 39 wherein in enabling insertion of an advertisement into the plurality of key frames, the publishing component is configured to enable:
identifying a low value key frame from the plurality of key frames; and
replacing the low value key frame with an advertisement.

43. The peer device of claim 39 wherein in enabling insertion of an advertisement into the plurality of key frames, the publishing component is configured to enable:
identifying a key frame from the plurality of key frames that is desirable for a product placement advertisement; and
inserting the product placement advertisement into the plurality of key frames at a location selected from a group consisting of: before the key frame identified as being desirable for the product placement advertisement, after the key frame identified as being desirable for the product placement advertisement, and within the key frame identified as being desirable for the product placement advertisement.

44. The peer device of claim 31 wherein the peer device is connected between at least one video playback device and a display device, and wherein:
the obtaining component is further configured to receive the video content item from one of the at least one video playback device; and
the publishing component is further configured to provide the video content item to the display device for presentation.

* * * * *